United States Patent [19]

Nakano et al.

[11] Patent Number: 5,142,320
[45] Date of Patent: Aug. 25, 1992

[54] INDICATING APPARATUS DISPLAYING ENLARGED INFORMATION OF CAMERA

[76] Inventors: Satoshi Nakano; Takeshi Matsushita, both of 36-9, Maenocho 2-chome, Itabashi-ku, Tokyo, Japan

[21] Appl. No.: 579,691

[22] Filed: Sep. 10, 1990

[30] Foreign Application Priority Data

Sep. 8, 1989 [JP] Japan .................................. 1-233950

[51] Int. Cl.⁵ ............................................. G03B 17/18
[52] U.S. Cl. ................................... 354/471; 354/475; 354/289.1
[58] Field of Search ...................... 354/475, 289.1, 465, 354/468, 471, 474, 475, 289.12

[56] References Cited

U.S. PATENT DOCUMENTS

| | | | |
|---|---|---|---|
| 4,135,795 | 1/1979 | Uno et al. | 354/475 |
| 4,156,562 | 5/1979 | Kawasaki et al. | 354/471 |
| 4,313,657 | 2/1982 | Tokutomi et al. | 354/474 |
| 4,397,533 | 8/1983 | Naruse et al. | 354/475 |
| 4,436,397 | 3/1984 | Kobayashi | 354/465 |
| 4,716,429 | 12/1987 | Misawa | 354/289.1 |
| 4,949,118 | 8/1990 | Yamamoto et al. | 354/475 |
| 4,982,220 | 1/1991 | Akasaka | 354/468 |

*Primary Examiner*—W. B. Perkey
*Assistant Examiner*—Cassandra C. Spyrou

[57] ABSTRACT

An indicating apparatus of a camera having a camera body which has an indicating portion in which information on the camera is indicated. The indicating portion includes a main indicating portion, which generally indicates the information on the camera, and an enlarged indicating portion, which enlarges and indicates specific information indicated in the main indicating portion.

57 Claims, 31 Drawing Sheets

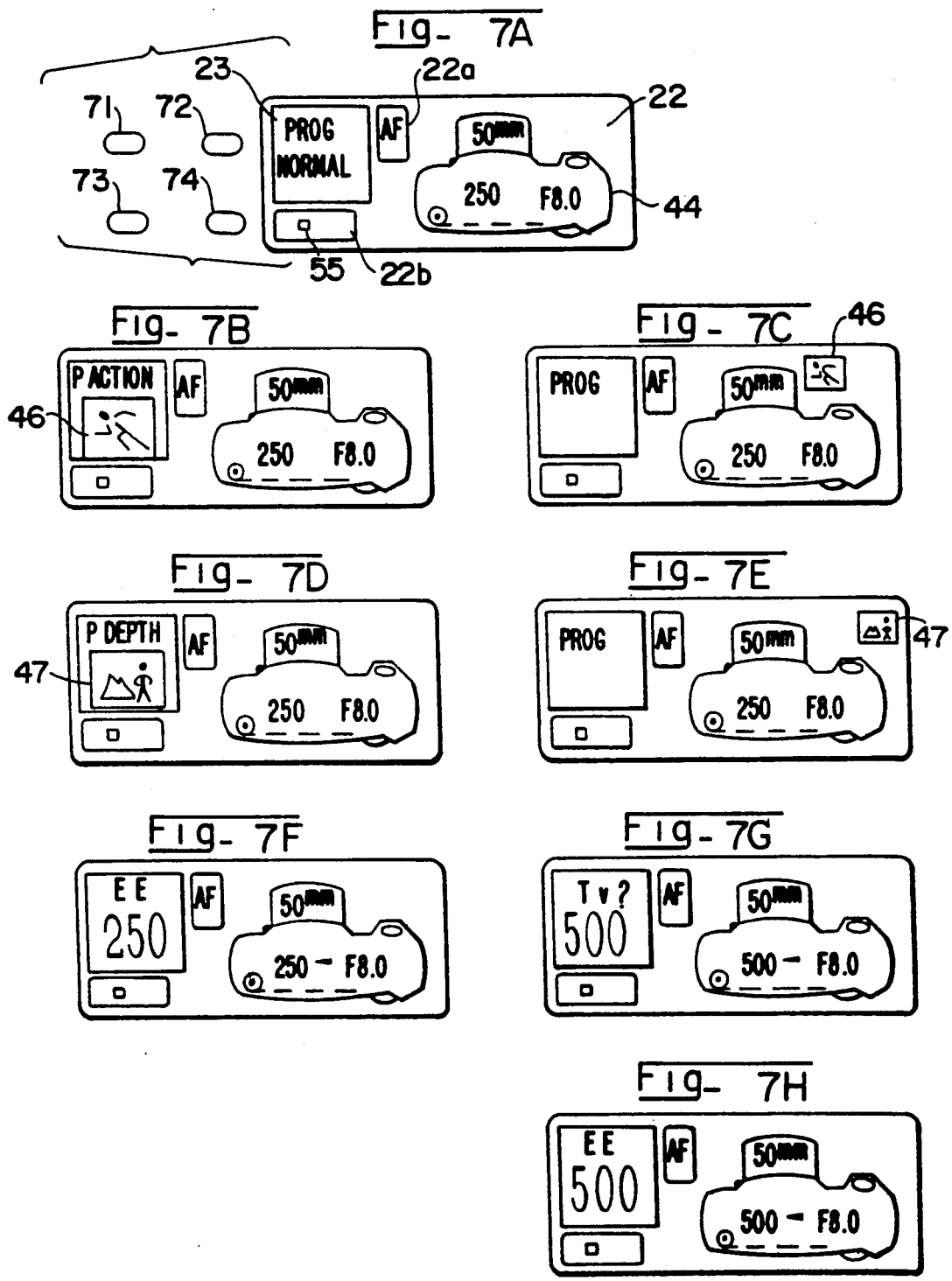

INDICATING APPARATUS DISPLAYING ENLARGED INFORMATION OF CAMERA

BACKGROUND OF THE INVENTION

1. Field of the invention

The present invention relates to an indicating apparatus of a camera, and more precisely, it relates to an indicating apparatus having an indicator for indicating various photographing data in a camera.

2. Description of the Related Art

Presently, in an automatic camera having an automatic focusing (AF) device and/or an automatic exposure (AE) device, there is a need for reducing the focusing time and for increasing the precision of the focusing operation. Furthermore, it is often required to provide an indicating apparatus having a large indicating plane in which various data including programmed exposure mode data (e.g., such as a shutter speed priority mode for a telephotographic lens or a depth of field priority mode for a wide angle lens) data of the number of frames of film in which pictures have been taken (which will be referred to as the number of taken frames hereinafter), and various photographing data, are indicated so as to be easily observed at a glance.

There is a known camera having a liquid crystal display in which various exposure modes (e.g., such as a manual exposure mode an auto-exposure mode, a program exposure mode or a bulb exposure mode) shutter speed data, or data of the number of taken frames are indicated. In addition, the camera has a mode selection switch, so that a photographer can change the mode data by the selection switch, while observing the photographing data indicated in the liquid crystal display.

However, in such a known camera, the data indicated in the display is not large enough to be easily observed at a glance, thus resulting in a difficulty in operation particularly upon selecting the modes.

SUMMARY OF THE INVENTION

The primary objective of the present invention is to eliminate the drawbacks mentioned above by providing an indicating apparatus in which the indicated data can be easily observed and the mode selection can be easily operated.

To achieve this objective, according to the present invention, there is provided an indicating apparatus of a camera, having an indicating portion provided on a camera body. The indicating portion comprises a main indicating portion in which information on the camera are generally indicated, and an enlarged indicating portion in which specific information indicated in the main indicating portion is enlarged and indicated.

With this arrangement, the specific information (e.g., shutter speed data that a photographer desires to learn, is quickly indicated with an enlarged scale. As a result, the photographer can easily observe the specific information and set the photographing modes, etc.

BRIEF DESCRIPTION OF THE DRAWINGS

The invention will be described below in detail with reference to the accompanying drawings, in which:

FIG. 7A is a schematic plan view of a dot LCD and a segment LCD at a "PROGRAM NORMAL";

FIGS. 7B and 7C are schematic plan views of a dot LCD and a segment LCD at an "PROGRAM ACTION";

FIGS. 7D and 7E are schematic plan views of a dot LCD and a segment LCD at a "PROGRAM DEPTH OF FIELD PRIORITY";

FIGS. 7F, 7G and 7H are schematic plan views of a dot LCD and a segment LCD at a "SHUTTER PRIORITY MODE";

DESCRIPTION OF THE PREFERRED EMBODIMENTS

Figure 1:
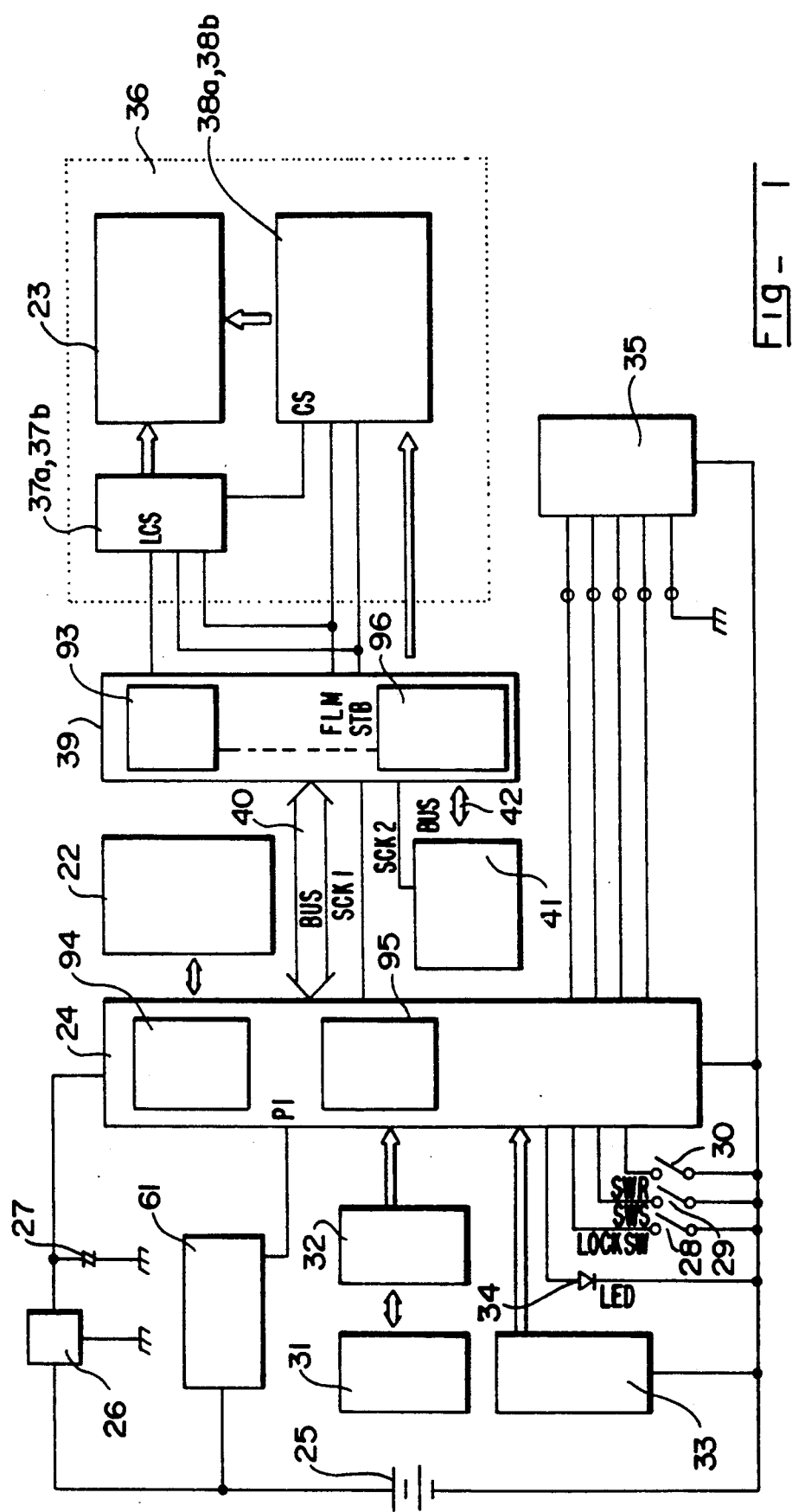
FIG. 1 is a block diagram of a control unit of an indicating apparatus of a camera according to the present invention.

In FIG. 1 which shows a control circuit (control unit) of an indicating apparatus according to the present invention, a camera 21 has an AF device, an automatic loading device, an automatic winding and rewinding device, and an AE device, etc. These devices are in themselves known.

Figure 4:
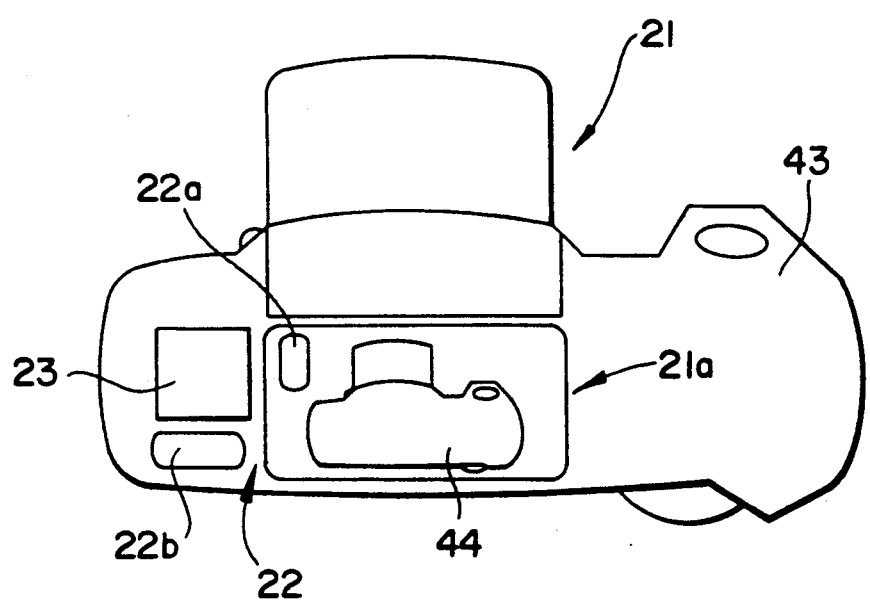
FIG. 4 is a plan view of a camera which incorporates therein an indicating apparatus according to the present invention.

The camera 21 has a pentagonal prism 21a (as shown in FIG. 4) which is provided on the camera 21 with a segment LCD 22 in which information related to the camera is concentrated and indicated. The dot LCD 23 indicates only enlarged specific information indicated in the segment LCD 22. The segment LCD 22 is connected to a CPU 24, so that the necessary data is fed to the segment LCD 22 from the CPU 24. The CPU 24 is comprised of an IC which can drive the segment LCD 22. The electrical power is supplied to the CPU 24 from a battery 25 through a regulator 26.

A lock switch 28, a photometer switch 29 and a release switch 30 are provided in the control circuit. When the lock switch 28 is turned ON, and when the photometer switch 29 or the release switch 30 is turned ON, the P1 terminal of the CPU 24 becomes "L" (Low level), so that a DC/DC converter 61 is activated to supply the various elements with the electrical power. Numeral 27 designates a super capacitor (condenser) which compensates a possible sudden voltage drop of the battery 25. Numeral 31 designates a CCD image sensor, 32 a CCD process circuit, 33 a switch box, 34 an LED, 35 an internal ROM, and 36 a indicating box 36, respectively.

The indicating box 36 has row drivers 37a and 37b, the dot LCD 23, and column drivers 38a and 38b. An LCD controlling micro computer 39 is connected to the CPU 24 through a bus 40 and has an internal indicating RAM 93 which constitutes an indication control device.

The indication data, based on a transfer clock signal SCK1, is fed to the LCD controlling micro computer 39 from the CPU 24 through the bus 40.

The indication data includes various data, such as an exposure mode Tv, an Av, an ISO and an Xv, etc.

The indicating RAM 93 periodically feeds data to the column drivers 38a and 38b to send the timing signals to the drivers 37a and 37b to drive the dot LCD 23. The indicating RAM 93 functions, as a indicating control device, to indicate the enlarged information to be indicated in the segment LCD 22 when the photographing mode is changed (i.e., when the various operational switches provided in the switch box 33 are actuated).

Namely, the data fed from the CPU 24 is converted to the indicating RAM data in the indicating RAM 93 to enlarge and indicate the data in the dot LCD 23. If necessary, data of a character generator 41 is referred to. The data of the character generator 41 is sent to the LCD controlling micro computer 39 through the bus 42 in accordance with the transfer clock signal SCK2. The logical addition of the data and the indicating RAM data is the final indicating RAM data. The indicating RAM bit corresponds to one dot in the dot LCD 23.

The indicating RAM data is periodically transferred to the column drivers 38a and 38b in accordance with a timing signal generated by the LCD controlling micro computer 39. Chip selectors CS0 and CS1 of the row drivers 37a and 37b are terminals which select the column drivers 38a and 38b in which the data are to be written.

Figure 2:
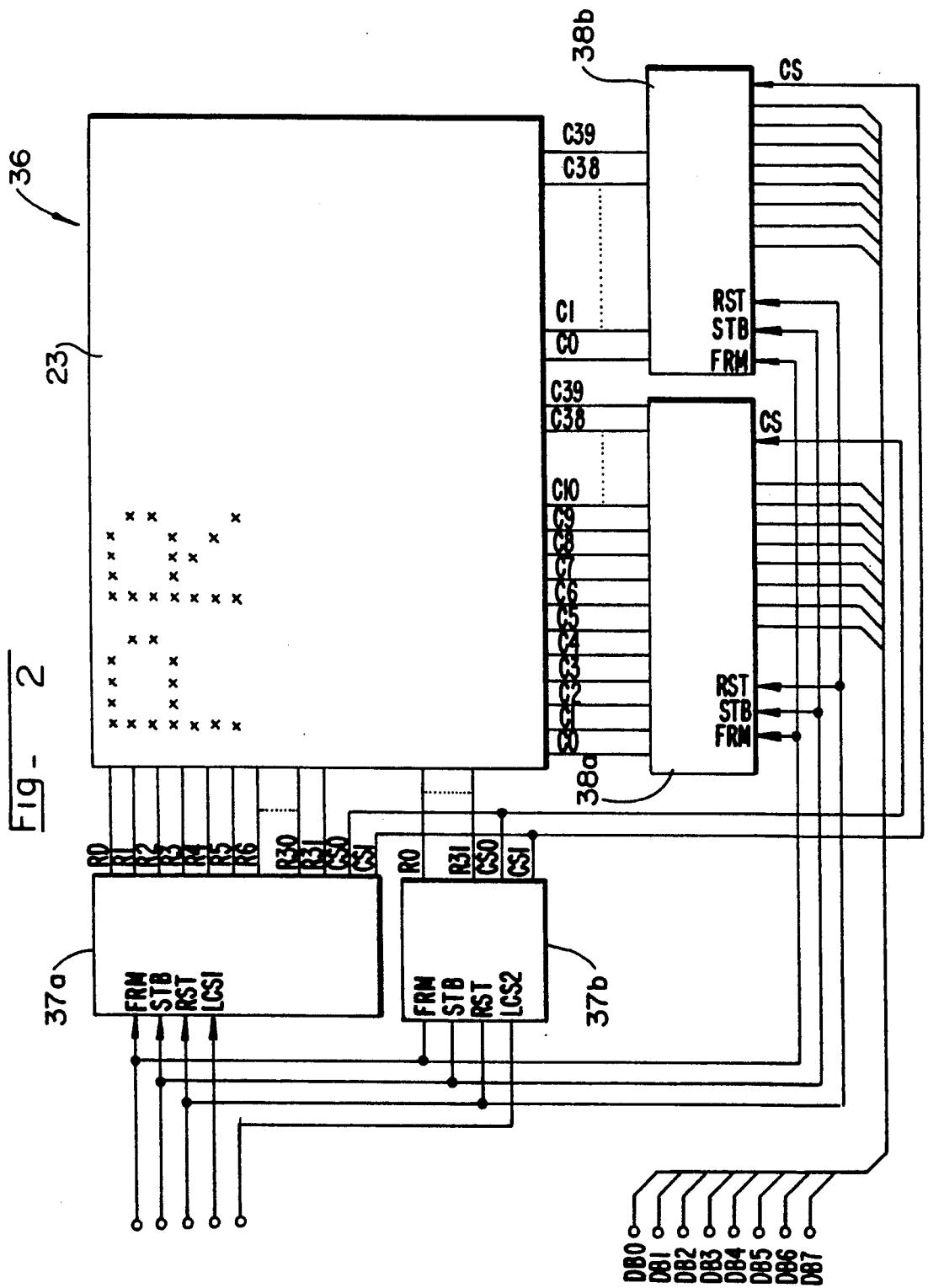
FIG. 2 is an enlarged view of a main part of a control unit shown in FIG. 1.

After the indicating data is gathered in the column drivers 38a and 38b, when the LCD controlling micro computer 39 issues an STB signal to the row driver 37a or 37b, the data of one column of indication is outputted from the column driver 38a or 38b. As a result, the data of one row is outputted from the row driver 37a or 37b, and the data of one column is indicated in the dot LCD 23. These operations are repeated to indicate the enlarged information in the dot LCD 23. In FIG. 2, DB0 through DB7 designate data signal lines.

Figure 3:
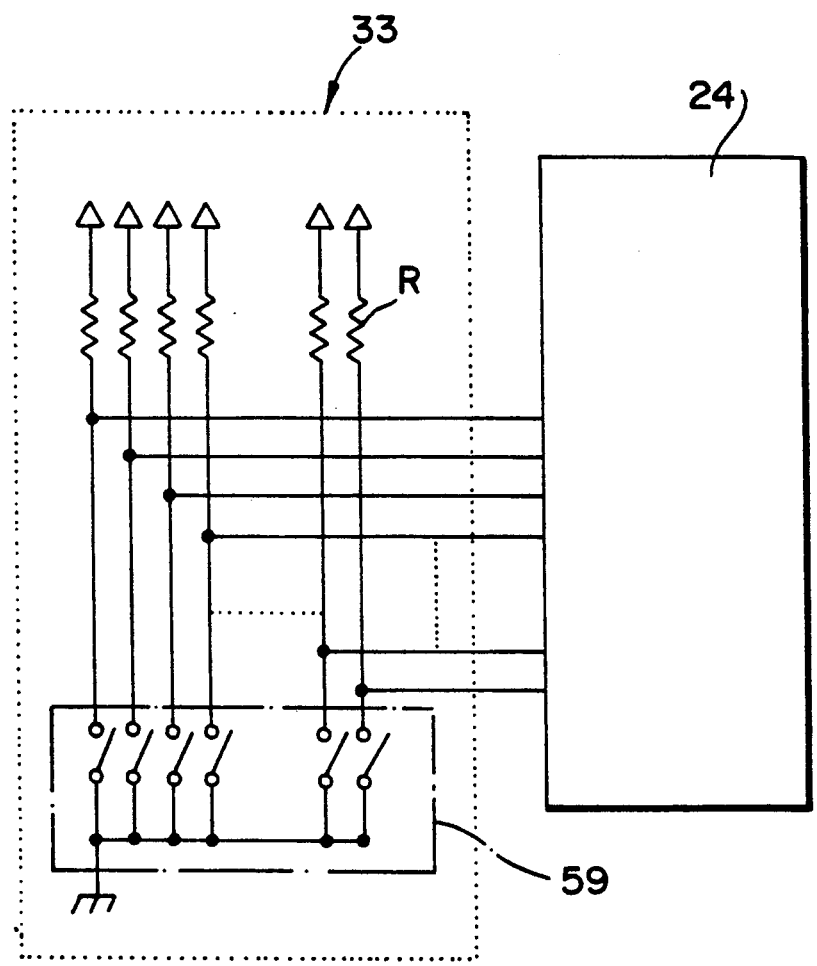
FIG. 3 is a schematic view of a switch box shown in FIG. 1, by way of example.

FIG. 3 shows an example of the switch box 33 having operational switches 71 through 90, 97 and 98 (see FIG. 6), constituting a photographing mode varying (switching) device. In the illustrated embodiment, pull-up resistances R are provided in the switch box 33. Alternatively, it is possible to provide the pull-up resistances in the CPU 24. Furthermore, it is also possible to construct the pull-up resistances R so as to pull up only when the switch check is activated.

The CPU 24 has an information transferring and indicating device 94 and an error detecting device 95.

The transferring and indicating device 94 functions to erase the enlarged information which is indicated in the dot LCD 23, when the operational switches 71 through 90 and/or the up-switch 97 and the down-switch 98 are not being operated or after the lapse of a predetermined time, and to indicate the data in the segment LCD 22.

The error detecting means 95 continuously detects an error (abnormality) of the camera functions. When an error is detected, the detection signal is sent to the error indication control means 96 provided in the LCD controlling microcomputer 39. The error indication control means 96 indicates enlarged information of the error of the camera function in the dot LCD 23 and/or the segment LCD 22.

The segment LCD 22 and the dot LCD 23 which constitute the main indicating portion and the enlarged indicating portion, respectively will be described below in more detail.

As can be seen in FIG. 4, the segment LCD 22, which can indicate segment of information, is provided in the center portion of the camera body 43 of the camera 21. The dot LCD 23, which can indicate information by dots, is provided on the left side of the segment LCD 22. The segment LCD 22 has a body indicating portion 44, which is an illustration of a profile of a camera body and a lens portion as viewed from above. Also, a frame portion 22a (see FIG. 5) and a frame portion 22b are designed on the camera body at the upper left portion and the lower left portion of the camera body, respectively.

Figure 5:
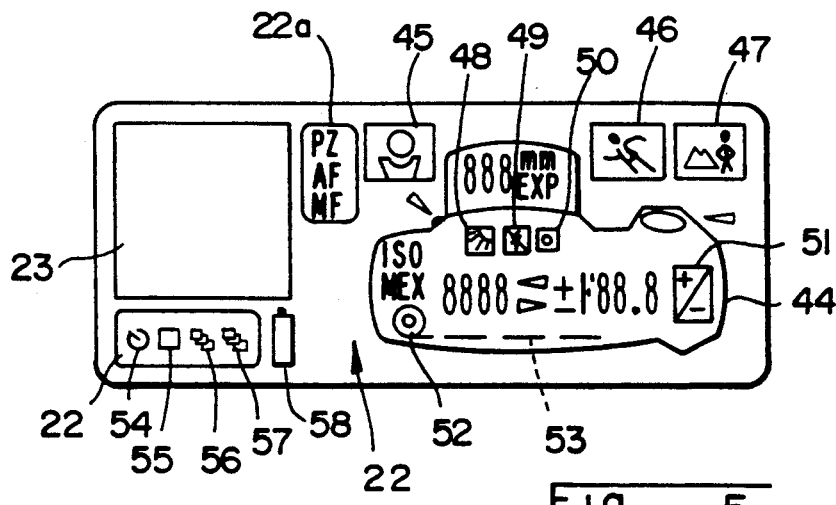
FIG. 5 is a plan view of a dot LCD and a segment LCD in an indicating apparatus according to the present invention.

In FIG. 5 in which all the segments are turned ON. English characters (symbols) "PZ", "AF" and "MF" are indicated in the frame portion 22a of the segment LCD 22. The "PZ" represents the powered zoom mode, "AF" the auto focus mode, and "MF" the manual focus mode, respectively. The symbols 45, 46 and , which represent the powered zoom mode, the high shutter speed priority program (action mode) and the depth of field priority program respectively, are indicated on the right side of the respective English characters.

The symbol "888", displayed by three seven-segment indicators, is indicated to correspond to the lens portion of the body indicating portion 44. Furthermore, an English character "EXP" is indicated. The character "EXP" is the abbreviation for exposure. The English characters "ISO" and "MEX" (multi-exposure) are indicated in the body indicating portion 44. On the right side of these characters are indicated the symbols 48, 49 and 50 which represent the "DAYLIGHT SYNCHRO MODE", the "AUTOMATIC EMISSION PROHIBITION" and the "SPOT PHOTOMETERING MODE", , respectively. The symbol "8888", displayed by four seven-segment, and the symbol "±F 88.8" by three seven-segment indicators are indicated below the symbols 48, 49 and 50.

The symbol 51 representing the , which is the abbreviation for the "multi-auto bracketing" in which the pictures are continuously taken while automatically and discontinuously varying the , is indicated on the right side of the symbols "8888" and "±F 88.8". The symbol 52, shown by a small circle 52, represents the patrone, or cassette and is indicated in the center lower portion of the camera body. The symbol 53, shown by the dotted line 53, represents the film.

The symbols 54, 55, 56 and , which represent the "SELF-TIMER MODE", the "SINGLE PHOTOGRAPHING MODE", the "CONTINUOUS PHOTOGRAPHING MODE", and the "MAB MODE" respectively, are indicated in the frame portion 22b of the segment LCD 22. The battery mark 58 is indicated on the right side of these symbols.

Figure 6:
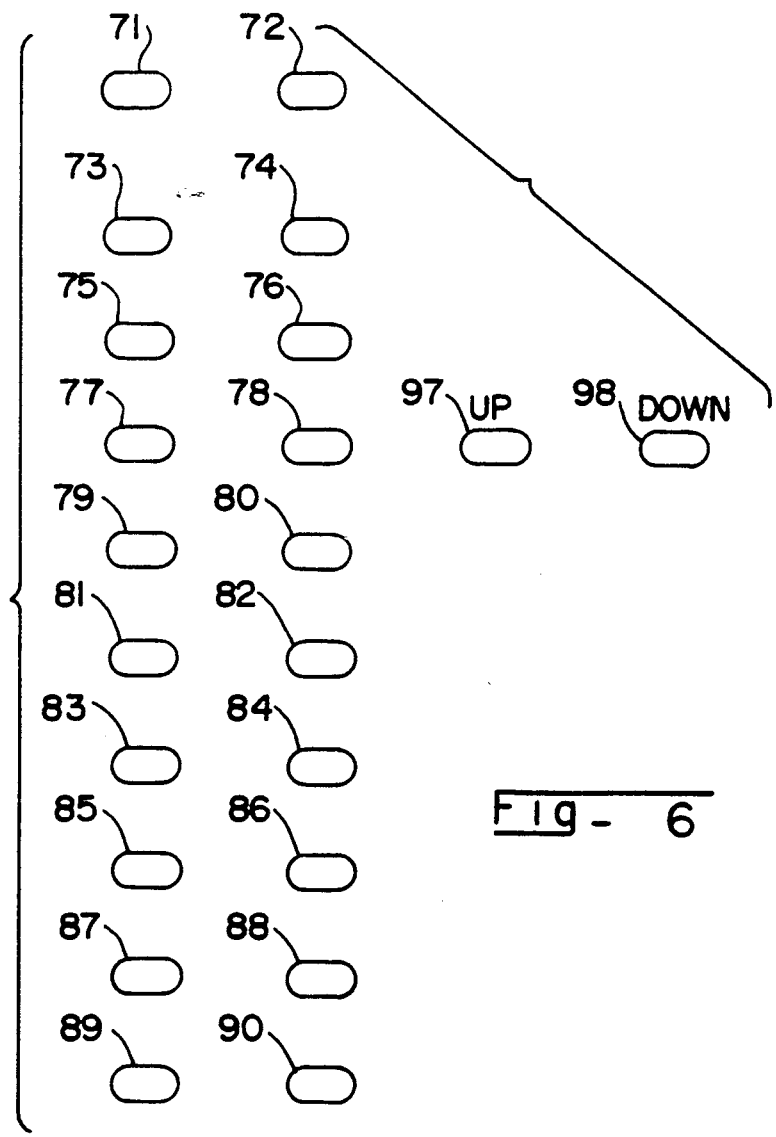
FIG. 6 is a schematic view of an operational switch, an up-switch and a down-switch in an indicating apparatus according to the present invention.

FIG. 6 schematically shows the operational switches 71 through 90, the up-switch 97 and the down-switch 98, constituting the photographing mode varying (switching) device.

The following discussion will be directed to the indications of the segment LCD 22 and the dot LCD 23 when the operational switches 71 through 90, the up-switch 97 and the down-switch 98 are actuated.

When the lens switch is turned to "AUTO" to set the "EXPOSURE MODE", the indication plane is as shown in FIG. 7A. The symbol "PROG NORMAL" is indicated in the dot LCD 23 and the standard program is set. The characters "AF" and the symbol 55 which represent the "SINGLE PHOTOGRAPHING MODE" are indicated in the frame portion 22a and 22b of the segment LCD 22, respectively. When the operational switch 71 (a mode switch) is turned ON, and when the up-switch 97 or the down-switch 98 is turned ON, "P ACTION" is indicated in the dot LCD 23 in accordance with the data of the indicating RAM 93, so that the "PROGRAM ACTION" can be selected (see FIG. 7B). The "PROGRAM ACTION" means a high speed shutter priority mode.

If the operational switch 71 is made OFF, the up-switch 97 or the down-switch 98, was turned ON, is turned OFF. As a result, the symbol 46 disappears and the symbol "PROG" appears in the indicating plane, as shown in FIG. 7C. The small symbol , which has been indicated with an enlarged scale in the dot LCD , is moved to the upper right corner portion of the body indicating portion 44 in the segment LCD 22 in accordance with the data moving and indicating device 94.

In FIG. 7A, when the up-switch 97 or the down-switch 98 is turned ON by the indicating RAM (indicating control device) and the operational switch 71 is turned ON, the indication of the dot LCD 23 is changed to "P DEPTH" (see FIG. 7D), and the enlarged symbol 47 representing the depth of field priority program is indicated. In this state, after the operational switch 71 and the up-switch 97 or the down switch 98 which were turned ON are turned OFF, the symbol "PROG" is indicated in the dot LCD 23. At the same time, the symbol , which has been indicated with an enlarged , disappears in accordance with indicating device 94 and a small symbol 47 is indicated in the upper right corner portion of the indicating plane. As a result, a photographer can visually confirm the mode set by himself or herself by the small symbol 47 indicated in the segment LCD 22.

In FIG. 7A, when the up-switch 97 or the down-switch 98 is turned ON and the operational switch 71 is turned ON, the indication changes, as shown in FIG. 7F. Namely, the English character "EE" appears in the dot LCD 23 and the enlarged symbol "250" representing the shutter speed is displayed to indicate the "SHUTTER PRIORITY MODE". When the operational switch 71 is turned OFF, and only the up-switch 97 or the down-switch 98 is turned ON, the indication of the dot LCD 23 changes, as shown in FIG. 7G.

Namely, the symbol "TV ? 500" is indicated to show that the shutter speed at the shutter priority is "500". At the same time, the symbol "250" which was indicated in the body indicating portion 44 is changed to "500". In this state, when the up-switch 97 or the down-switch 98 is turned OFF, the indication changes, as shown in FIG. 7H, in which the large symbol "EE 500" is indicated.

Another example of the operation of the "EXPOSURE MODE" will be explained below, with reference to FIGS. 8A through 8J.

Figure 8A:
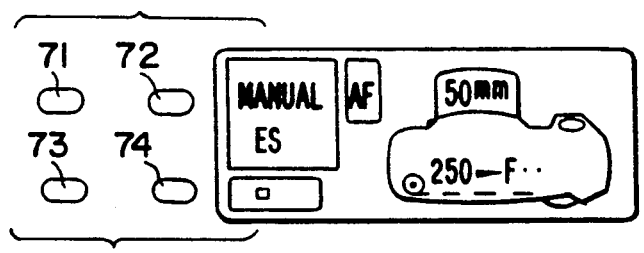
FIG. 8A is a schematic plan view of a dot LCD and a segment LCD at an "EXPOSURE MODE"
Figure 8B:
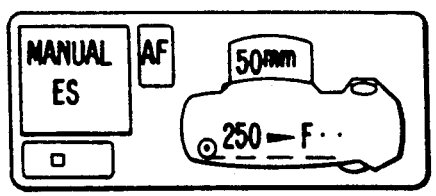
FIGS. 8B and 8C are schematic plan views of a dot LCD and a segment LCD at a "DIAPHRAGM PRIORITY MODE"
Figure 8C:
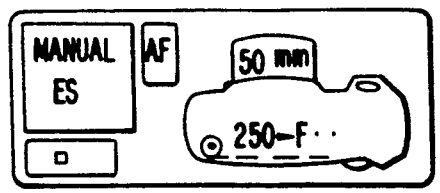

When the lens switch is changed from the "AUTO" to the "MANUAL", the large English characters "MANUAL ES" is indicated in the dot LCD 23. In this state, when the up-switch 97 or the down-switch 98 is turned ON and the operational switch 71 is turned ON, no change of indication occurs, as shown in FIG. 8A. When the operational switch 71 and the up-switch 97 or the down switch 98, which were turned ON are turned OFF, the "DIAPHRAGM PRIORITY MODE" is set (see FIG. 8C), and there is still no change of indication.

Figure 8D:
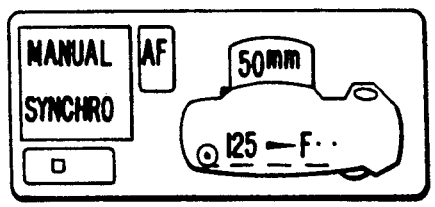
FIGS. 8D and 8G are schematic plan views of a dot LCD and a segment LCD at a "STROBE SYNCHRO MODE"
Figure 8G:
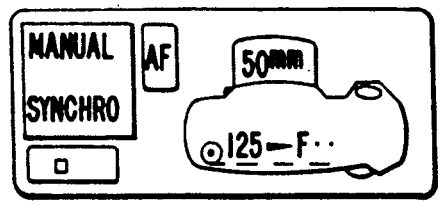
Figure 8E:
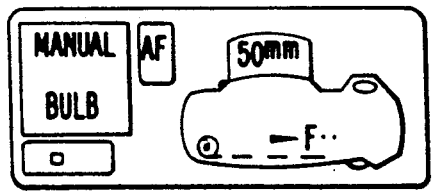
FIGS. 8E and 8H are schematic plan views of a dot LCD and a segment LCD at a "BULB EXPOSURE MODE"
Figure 8H:
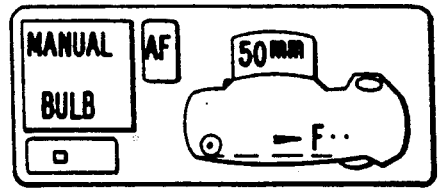
Figure 8F:
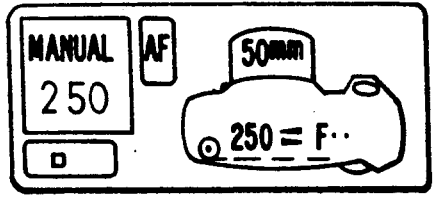
FIGS. 8F, 8I and 8J are schematic plan views of a dot LCD and a segment LCD at a "SHUTTER PRIORITY MODE"
Figure 8I:
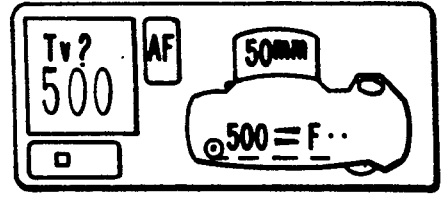
Figure 8J:
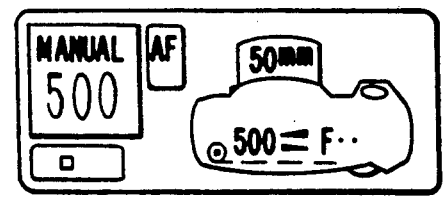

In FIG. 8A, when the up-switch 97 or the down-switch 98 is turned ON and the operational switch 71 is turned ON, the indication changes as shown in FIGS. 8D through 8F. In FIG. 8D, the large symbol "MANUAL SYNCHRO" which corresponds to the "STROBE SYNCHRO MODE" is indicated in the dot LCD 23. In this state, when the operational switch 71 and the up-switch 97 or the down-switch 98 are turned OFF, the indication changes, as shown in FIG. 8G in which the "STROBE SYNCHRO MODE" is set.

In FIG. 8E, the large symbol "MANUAL BULB" is indicated and the symbol , which represents the shutter speed in the body indicating portion 44 disappears. In this state, when the operational switch 71 and the up-switch 97 or the down-switch 98 which were turned ON are turned OFF, the "MANUAL BULB" mode is set without changing the indication of the dot LCD 23, as shown in FIG. 8H.

In FIG. 8F, the large symbol "MANUAL 500" and the "SHUTTER PRIORITY MODE" are indicated in the dot LCD 23. The initial shutter speed, (e.g. "250") is indicated in the body indicating portion 44. In this state, when the operational switch 71 is turned OFF, and the up-switch 97 or the down switch 98 is turned ON, the shutter speed indicated in the body indicating portion 44 is changed from "250" to "500". Thereafter, when the up-switch 97 or the down-switch 98 is turned OFF, the "SHUTTER PRIORITY MODE" in which the shutter speed is "500" is set. In FIGS. 8C, 8G, 8H, 8I and 8J show indications of the indication planes when the different modes are set. Although the indication of the dot LCD 23 is maintained as it is, the indicated information can be erased.

FIGS. 9A through 9I show an example of the operation when the "STROBE MODE" is set.

Figure 9A:
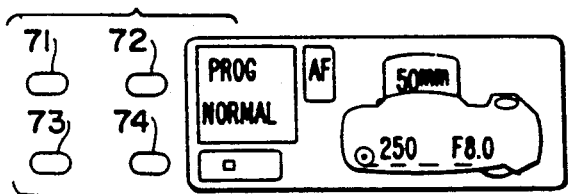
FIGS. 9A through 9I are schematic plan views of indicating planes indicating different information at a "STROBE MODE"
Figure 9E:
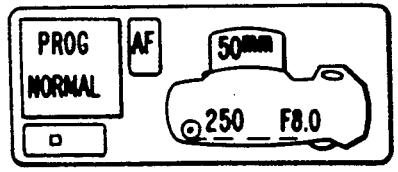

In FIG. 9A, the symbol "PROG NORMAL" is indicated in the dot LCD 23. The exposure value "F8.0" is indicated in the body indicating portion 44 of the segment LCD 22. In this state, when for example the operational switch 72 and the up-switch 97 or the down switch 98 are turned ON, the indication changes as shown in FIGS. 9B to 9D.

Figure 9B:
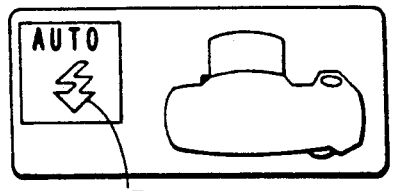
Figure 9F:
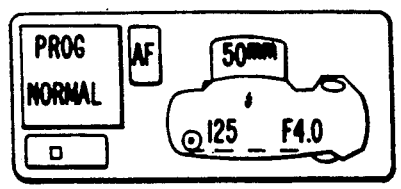
Figure 9C:
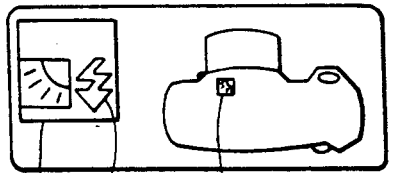

FIG. 9B shows an indication plane before the "STROBE LIGHT AUTOMATIC EMISSION MODE" is set. In FIG. 9B, all the information in the segment LCD 22 disappears and the large symbols "AUTO" and "63" representing the "STROBE PHOTOGRAPHING MODE" are indicated. In this state, when the operational switch 72 and the up-switch 97 or the down-switch 98, which were turned ON are turned OFF, the "STROBE LIGHT AUTOMATIC EMISSION MODE" is set. At the same time, the charging of the strobe is commenced, so that the symbols "50 mm", the small circle 52 "125" (which represents that the synchro and becomes 1/125 upon the completion of the ,, and "F8.0" (which represents the exposure value) are indicated in the body indicating portion. Upon the completion of the charging, the small symbol "63" is indicated in the body indicating portion 44.

Figure 9G:
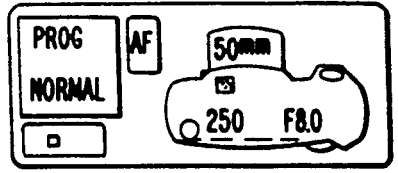
Figure 9H:
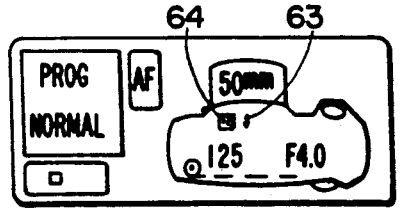

When the "DAYLIGHT SYNCHRO MODE" is selected, the small symbol "64" is indicated in the body indicating portion 44, and the large symbols "64", "63" and "SYNCHRO" are indicated in the dot LCD 23. In this state, when the operational switch 72 and the up-switch 97 or the down-switch 98 are turned OFF, the indication changes, as shown in FIG. 9G. In this case, "50 mm", "250" (which represents the shutter speed), "F8.0" (which represents the exposure value) and the dotted line "53" (which represents the film) are indicated in the body indicating portion 44. The small symbol "64" is also indicated in the body indicating portion 44. When the charging is completed, the small symbol 63 is indicated next to the symbol "64" in the body indicating portion 44.

Figure 9D:
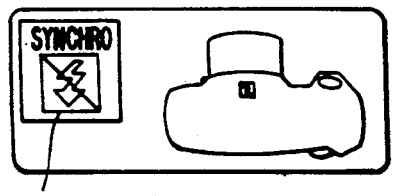
Figure 9I:
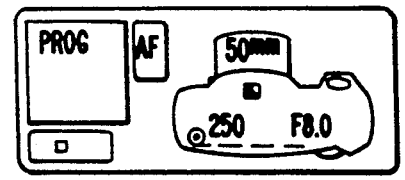

When the "AUTOMATIC LIGHT EMISSION PROHIBITION MODE" is selected, the large symbols "SYNCHRO" and "65" are indicated in the dot LCD 23 (see FIG. 9D). Only the small symbol "65" is indicated in the body indicating portion 44. In this state, when the operational switch 72 and the up-switch 97 or the down-switch 98 are turned OFF, the numerical symbols "50 mn" "250" (which represents the shutter speed) and "F 8.0" (which represents the exposure value) are indicated in the body indicating portion 44, as shown in FIG. 9I. The small symbol "65" is also indicated in the body indicating portion 44.

FIGS. 10A through 10I show an example of the operation when the "DRIVE MODE" is set.

Figure 10A:
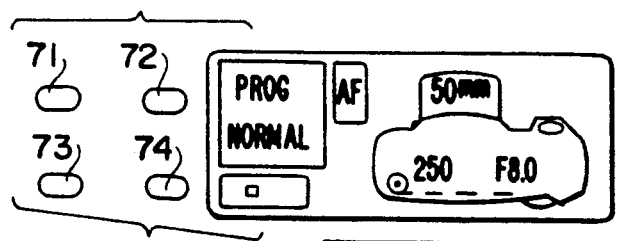
FIGS. 10A through 10J are schematic plan views of indicating planes indicating different information at a "DRIVE MODE"

FIG. 10A shows an indication plane before the operation starts. When, for example, the operational switch 73 and the up-switch 97 or the down-switch 98 are turned ON, the indication changes, as shown in FIGS. 10B through 10E.

Figure 10B:
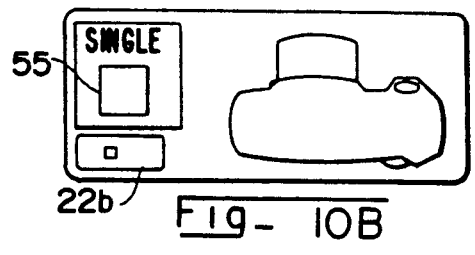
Figure 10F:
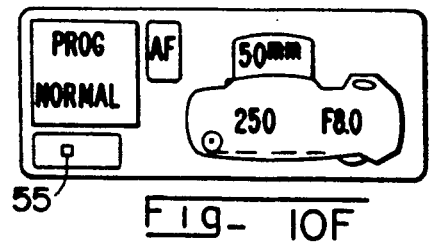

In FIG. 10B which shows an indicating plane when the "SINGLE PHOTOGRAPHING MODE" is selected, no information is indicated in the body indicating portion 44 of the frame portion 22b of the segment LCD 22. The large symbols "SINGLE" and "55", which represent the "SINGLE PHOTOGRAPHING MODE" are indicated in the dot LCD 23. In this state, when the operational switch 73 and the up-switch 97 or the down-switch 98 are turned OFF, the indication changes, as shown in FIG. 10F. Namely, the indication of the indicating plane is identical to that before the operation starts, as shown in FIG. 10A. The large symbol "55" indicated in the dot LCD 23 disappears, and the small symbol "55" is indicated in the frame portion 22b.

Figure 10C:
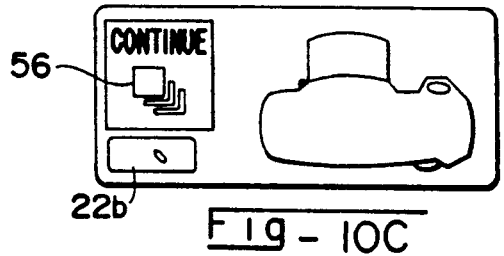
Figure 10G:
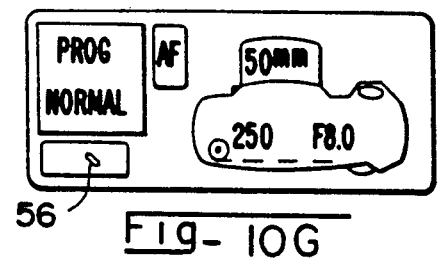

In FIG. 10C, when the operational switch 73 and the up-switch 97 or the down-switch 98, which were turned ON are turned OFF, the indication plane is returned to the plane before the operation started and the small symbol "56" is indicated in the frame portion 22b.

Figure 10D:
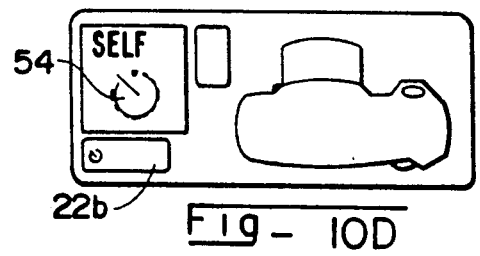
Figure 10H:
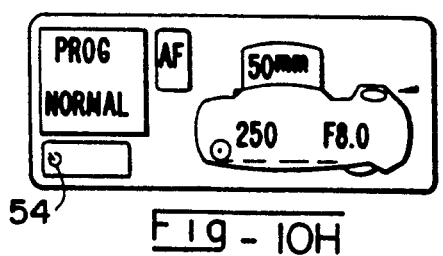

In FIG. 10D, which shows the indicating plane when the "SELF-TIMER MODE" is selected, no information is indicated in the segment LCD 22 and the small symbol "54" (which represents the self timer mode) is indicated in the frame portion 22b. Furthermore, the large symbol "54" is indicated in the dot LCD 23. In this state, when the operational switch 73 and the up-switch 97 or the down-switch 98 are turned OFF, the indicating plane is returned to the plane before the operation started, in which the small symbol "54" is indicated in the frame portion 22b.

Figure 10E:
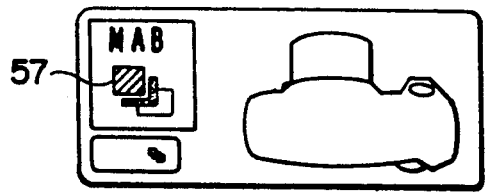
Figure 10I:
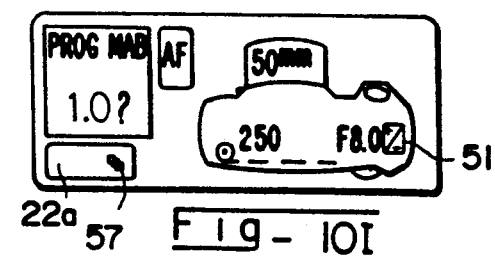

In FIG. 10E which shows the indicating plane when the "MAB MODE" is selected, no information is indicated in the segment LCD 22 and the small symbol "57" (which represents the "MAB MODE"), is indicated in the frame portion 22b. Furthermore, the large symbols "MAB" and "57" are indicated in the dot LCD 23. In this state, when the operational switch 73 and the up-switch 97 or the down-switch 98 are turned OFF, the indication changes, as shown in FIG. 10I. Namely, the indication of the indicating plane is identical to that before the operation started, except that the small symbol "51" (which represents the "MAB MODE") is indicated in the lower right portion of the body indicating portion 44 and that the small symbol "57" is indicated in the frame portion 22b.

Figure 10J:
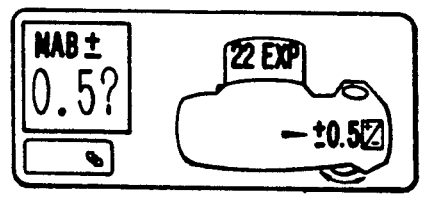

The symbols "PROG MAB" and "1.0 ?" are indicated in the dot LCD 23. In this state, the operational switch 74 and the up-switch 97 or the down-switch 98 are turned ON, the indication plane changes so that the large symbol "MAB ±0.5?" is indicated in the dot LCD 23. Thereafter, the width of change in the exposure value is set (e.g., "0.5"), and then the operational switch 73 and the up-switch 97 or the down switch 98 are turned OFF, the indicating plane changes, as shown, in FIG. 10J.

FIGS. 11A through 11E show an example of the operation when the "PHOTOMETER MODE" is set.

Figure 11A:
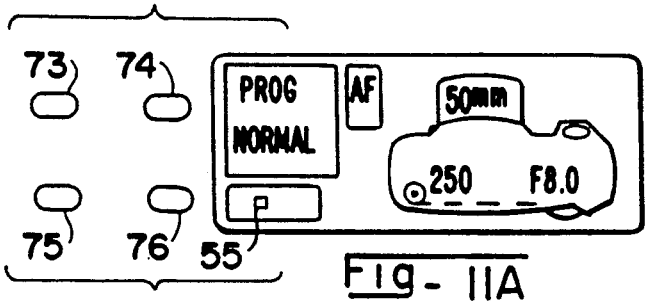
FIGS. 11A through 11E are schematic plan views of indicating planes indicating different information at a "PHOTOMETER MODE"

FIG. 11A shows an indication plane before the operation starts. When, for example, the operational switch 75 and the up-switch 97 or the down-switch 98 are turned ON, the indication changes, as shown in FIG. 11B.

Figure 11B:
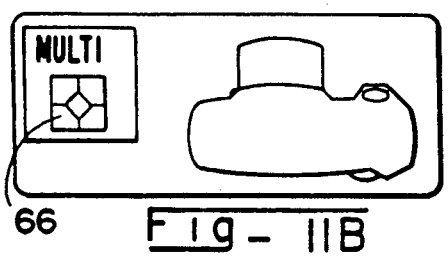
Figure 11C:
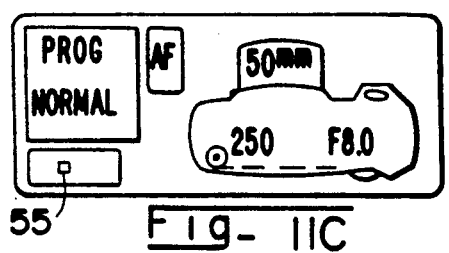

In FIG. 11B, no information is indicated in the segment LCD 22, and the symbol "MULTI" (which represents the divisional photometering) and the large symbol "66" are indicated in the dot LCD 23. In this state, when the operational switch 75 and the up-switch 97 or the down-switch 98 are turned OFF, the "DIVISIONAL PHOTOMETERING MODE" is set, and the indication of the indicating plane is returned to that before the operation started, as shown in FIG. 11C.

Figure 11D:
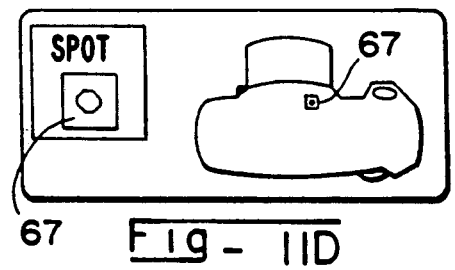
Figure 11E:
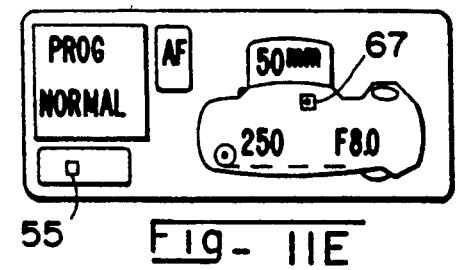

In FIG. 11D, which shows the indicating plane when the "SPOT PHOTOMETERING MODE" is selected, only the symbol "67" (which represents the "SPOT PHOTOMETERING") is indicated in the body indicating portion 44. Furthermore, the large symbol "SPOT" and the symbol "67" are indicated in the dot LCD 23. In this state, when the operational switch 75 and the up-switch 97 or the down-switch 98 are turned OFF, the indicating plane is returned to the plane before the operation started, in which the small symbol "67" is indicated in the body indicating portion 44, as shown in FIG. 11E.

Figure 12A:
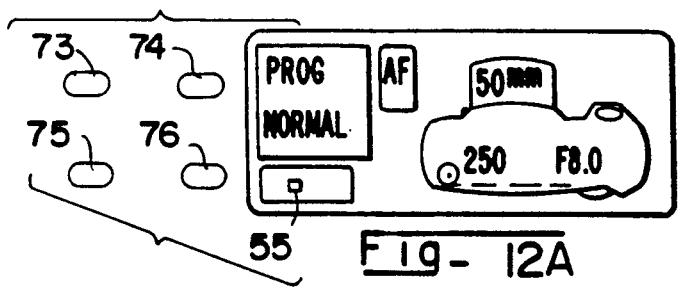
FIGS. 12A through 12C are schematic plan views of indicating planes indicating different information at an "EXPOSURE FACTOR MODE"
Figure 12B:
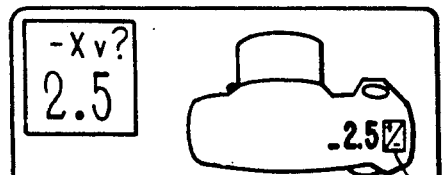
Figure 12C:
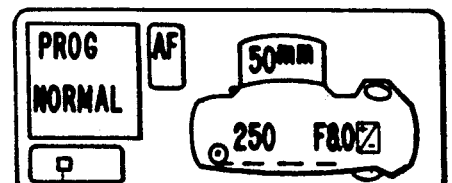

FIGS. 12A through 12C show an example of the operation when the "EXPOSURE FACTOR SETTING MODE" is set. The exposure setting mode is a mode in which the exposure factor is determined to correct the under-exposure. For example, when a picture is taken against the light.

FIG. 12A shows an indication plane before the operation starts. For example, the operational switch 74 and the up-switch 97 or the down-switch 98 are turned ON, the indication changes, as shown in FIG. 12B. In FIG. 12B, the small symbols "2.5" (which represents the exposure value) and "51" are indicated in the body indicating portion 44. At the same time, the symbol "—Xv ?" and the large symbol "2.5" (which represents the exposure factor) are indicated in the dot LCD 23.

In this state, when the operational switch 74 and the up-switch 97 or the down-switch 98 are turned OFF, the indication of the indicating plane is returned to that before the operation started. The small symbol 51 is indicated in the body indicating portion 44 and the small symbol "55" is indicated in the frame portion 22b.

FIGS. 13A through 13E show an example of the operation when the "ISO SETTING MODE" is set.

Figure 13A:
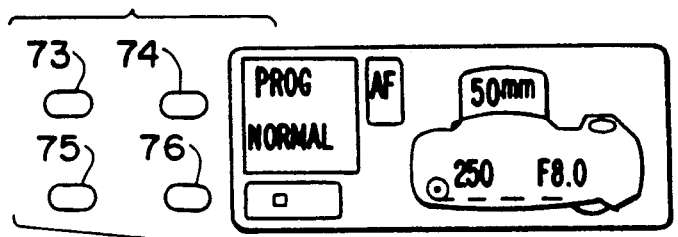
FIGS. 13A through 13E are schematic plan views of indicating planes indicating different information at an "I STEP ISO MODE"
Figure 13B:
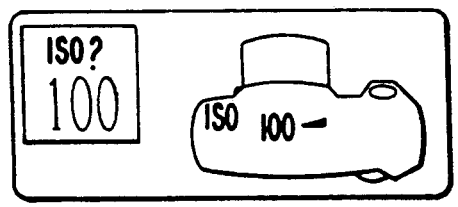
Figure 13D:
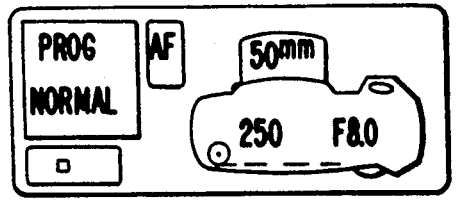
Figure 13C:
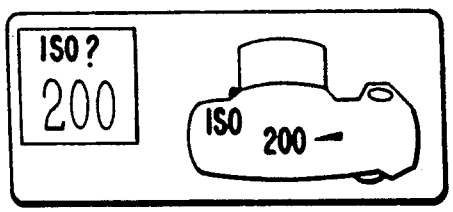

FIG. 13A shows an indication plane before an operation starts. When, for example, the operational switch 76 for setting the ISO and the up-switch 97 or the down-switch 98 are turned ON, the indication changes, as shown in FIG. 13B. In FIG. 13B, the, large symbols "ISO ?" and "100" (which represents the ISO value) are indicated in the dot LCD 23. At the same time, the small symbols "ISO" and "100" are indicated in the segment LCD 22. This value shows the latest set value. In this state, when the operational switch 76 and the up-switch 97 or the down-switch 98 are turned OFF, the indication of the indicating plane is returned to the plane before the operation started, as shown in FIG. 13D. In the illustrated embodiment, since the set ISO value is identical to the DX code of the film, no information is indicated in the body indicating portion 44.

Figure 13E:
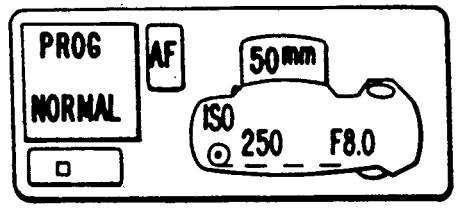

When the operational switch 76 and the up-switch 97 or the down-switch 98 are turned ON to set the ISO value to "200" (see FIG. 13C), the ISO value is different from the DX code of the film, and accordingly, the indicating plane after the ISO value is set is as shown in FIG. 13E. In this case the small symbol "ISO" is indicated in the upper left corner of the body indicating portion 44.

FIGS. 14A through 14E show an example of the operation when the "MULTI EXPOSURE MODE" is set.

Figure 14A:
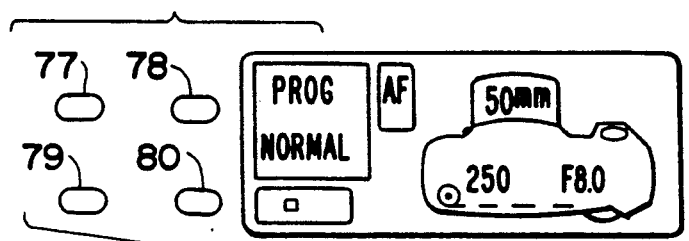
FIGS. 14A through 14E are schematic plan views of indicating planes indicating different information at a "MULTI EXPOSURE MODE"
Figure 14B:
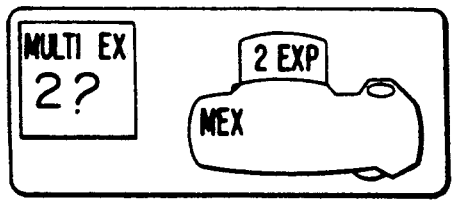
Figure 14C:
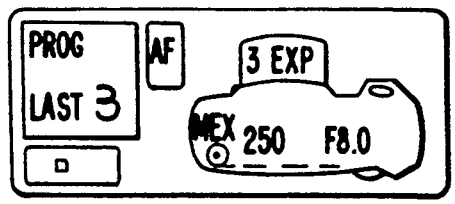

FIG. 14A shows an indication plane before the operation starts. When, for example, the operational switch 77 and the up-switch 97 or the down-switch 98 are turned ON, the information of the segment LCD 22 disappears, and the symbols "2 EXP" and "MEX" are indicated in the lens portion and the camera body portion, respectively, as shown in FIG. 14B. At the same time, the small symbol "MULTI EX" is indicated in the dot LCD 23. Also, for example the symbol "2?" is indicated in the dot LCD 23 to confirm the set number of frames. In this state, when the operational switch 77 and the up-switch 97 or the down switch 98 are turned OFF, the indication of the indicating plane is as shown in FIG. 14C. In this case, the symbols "3 EXP" and "PROG LAST 3" are indicated in the lens portion and the dot LCD 23, respectively. This shows that three exposures will be effected.

Figure 14D:
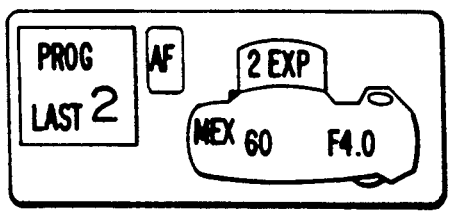
Figure 14E:
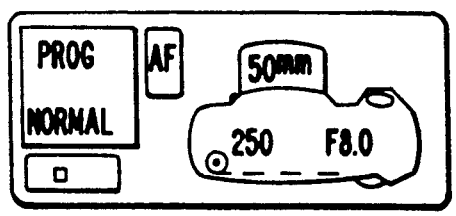

In this state, when the release switch 30 is turned ON, the indication of the lens portion is changed to "2 EXP" (as shown in FIG. 14D) and at the same time, the symbol "MEX" and the exposure value are changed to "60" and "F 4.0", from "250" and "F8.0", respectively. In addition, the indication of the dot LCD 23 is changed from "3" to "2", and upon the multi exposure, the indication plane is returned to the plane before the operation started, as shown in FIG. 14E.

Figure 15A:
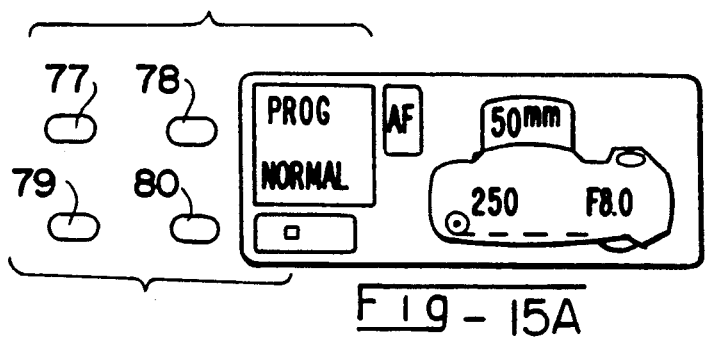
FIGS. 15A through 15C are schematic plan views of indicating planes indicating different information at an "AE LOCK MODE"
Figure 15B:
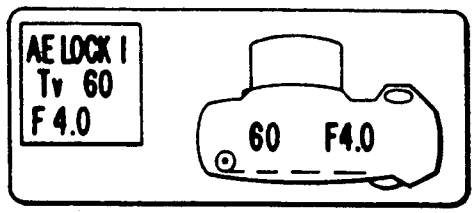
Figure 15C:
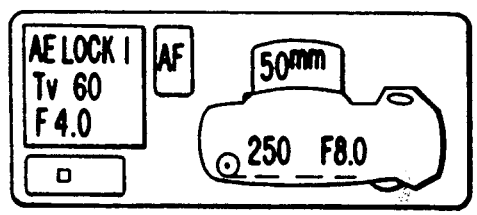

FIGS. 15A through 15C show an example of the operation when the "AE (Auto Exposure) LOCK MODE" is selected.

FIG. 15A shows an indication plane before the operation starts. When, the operational switch 78 (a memory lock switch) is turned ON, the large symbols "AE LOCK "1", "Tv 60" and "F 4.0" are indicated in the dot LCD 23, as shown in FIG. 15B. At the same time, the same content (i.e., the symbol "60 F4.0") is indicated in the segment LCD 22.

In this state, when the operational switch 78 is turned OFF, the indication of the indicating plane is as shown in FIG. 15C and the setting operation ends. Namely, the symbols "AE LOCK 1", "Tv 60" and "F 4.0" are indicated as they are in the dot LCD 22. The indication of the segment LCD 22 is identical to that before the operation started.

Figure 16A:
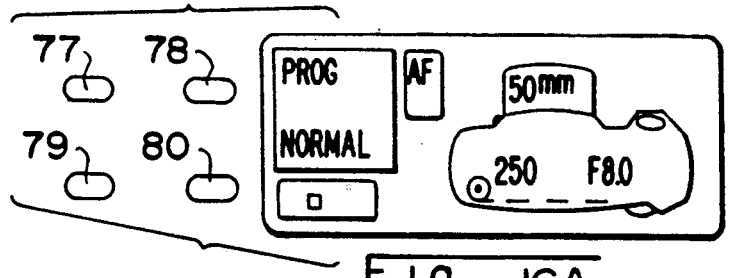
FIGS. 16A through 16C are schematic plan views of indicating planes indicating different information at an "AE LOCK MODE"
Figure 16B:
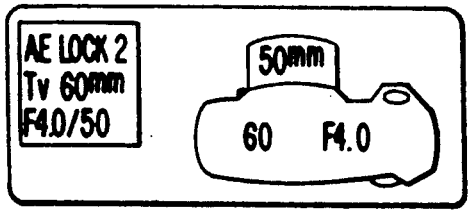
Figure 16C:
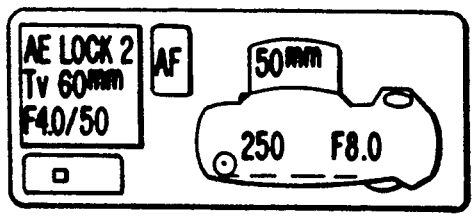

FIGS. 16A through 16C show another example of the operation when the "AE (Auto Exposure) LOCK MODE" is selected.

FIG. 16A shows an indication plane before the operation starts. When, for example, the operational switch 79 is turned ON, the symbols "AE LOCK 2", "Tv 60" and "F 4.0/50 mm" are indicated in the dot LCD 23, as shown in FIG. 16B. At the same time, the same content (i.e., the symbols "60" and "F4.0") are indicated in the body indicating portion 44. The symbol "60" means 1/60 second.

Upon the completion of the setting operation, when the operational switch 78 is turned OFF, the indication of the indicating plane is returned to the initial position shown in FIG. 16A, except for the dot LCD 23 in which the same information as that in FIG. 16B is indicated.

Figure 17A:
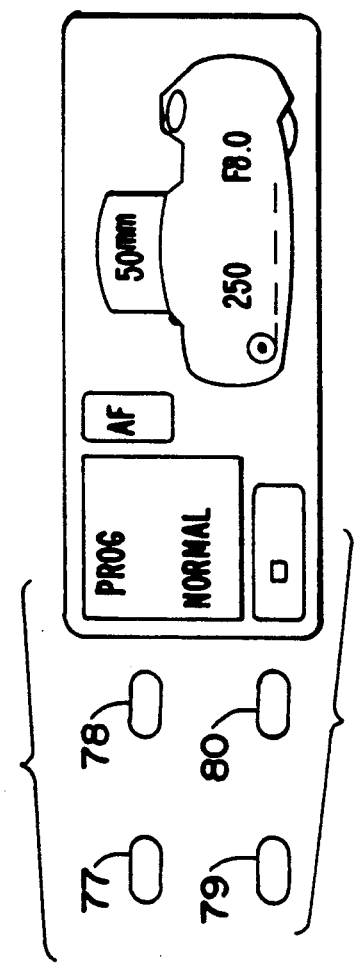
FIGS. 17A through 17C are schematic plan views of indicating planes indicating different information at an "AE LOCK MODE"
Figure 17B:
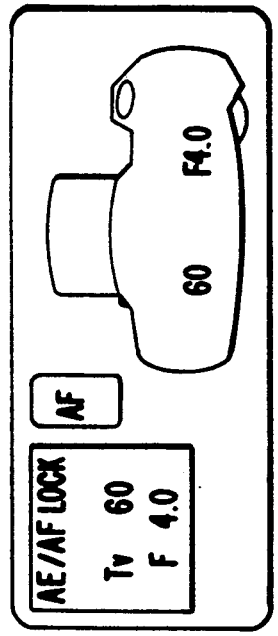
Figure 17C:
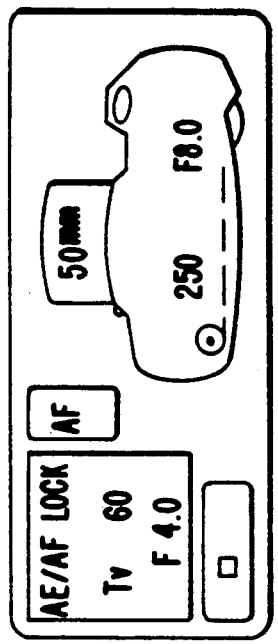

FIGS. 17A through 17C show other examples of the operation when the "AE (Auto Exposure) LOCK MODE" is selected.

FIG. 17A shows an indication plane before the, operation starts. When, for example, the operational switch 80 is turned ON, the symbols "AE/AF LOCK", "Tv 60" and "F 4.0" are indicated in the dot LCD 23, as shown in FIG. 17B. At the same time, the same content (i.e., the symbols "60" and "F4.0"), are indicated in the body indicating portion 44.

Upon the completion of the setting operation, when the operational switch 80 is turned OFF, the indication of the dot LCD 23 is maintained as it is and the indication of the segment LCD 22 is returned to the initial position shown in FIG. 17A (see FIG. 17C).

FIGS. 18A through 18G show an example of the operation when the "AF MODE" is selected.

Figure 18A:
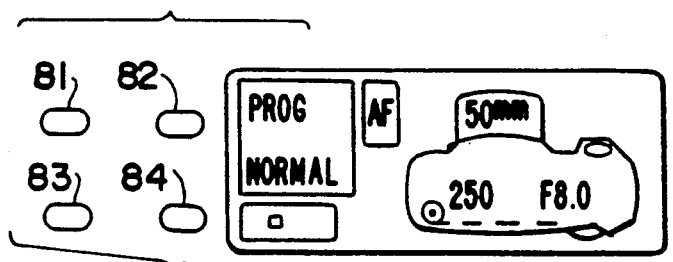
FIGS. 18A through 18G are schematic plan views of indicating planes indicating different information at an "AUTO FOCUS MODE"
Figure 18B:
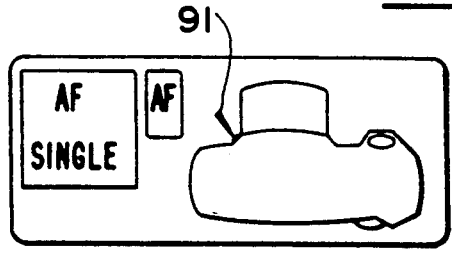
Figure 18C:
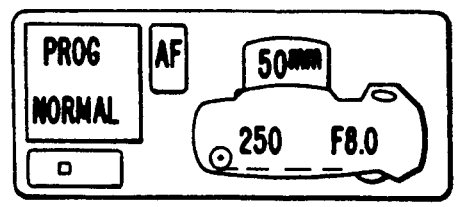

FIG. 18A shows an indication plane before the operation starts. To set the "AF SINGLE MODE", the operational switch 81 is turned ON. As a result, the indication of the indicating plane changes as shown in FIG. 18B. in this case the large symbol "AF SINGLE" is indicated in the dot LCD 23 and no information is indicated in the body indicating portion 44 of the segment LCD 22. The arrow 91 designates that "the associated switch should be actuated". In this state, when the operational switch 81 is turned OFF to complete the setting operation, the indication of the indicating plane is returned to the initial position, as shown in FIG. 18C.

Figure 18D:
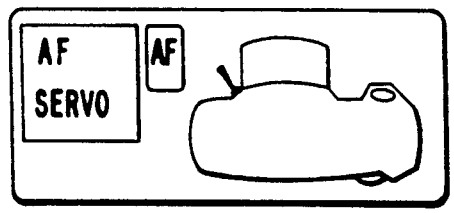
Figure 18E:
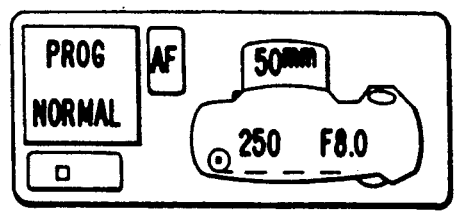

To set the "AF SERVO MODE", the operational switch 82 is turned ON in FIG. 18A. As a result, the indication of the indicating plane changes as shown in FIG. 18D, in which the large symbol "AF SERVO" is indicated in the dot LCD 23. Information other than the symbol "AF" and the arrow 91, indicated in the frame portion 22a are erased in the segment LCD 22. In this state, when the operational switch 82 is turned OFF to complete the setting operation, the indication of the indicating plane is returned to the initial position, as shown in FIG. 18E.

Figure 18F:
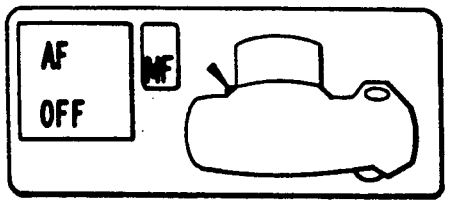
Figure 18G:
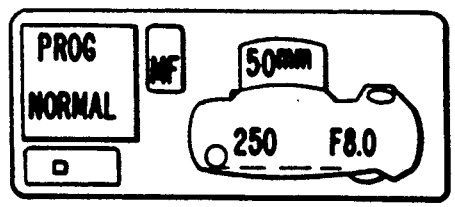

To set the "MANUAL AF MODE", the operational switch 83 is turned ON in FIG. 18A. As a result, the indication the indicating plane changes as shown in FIG. 18F, in which the large symbol "AF OFF" is indicated in the dot LCD 23. Information other than the symbol "MF" and the arrow 91, indicated in the frame portion 22a are erased in the segment LCD 22. In this state, when the operational switch 83 is turned OFF to complete the setting operation, the indication of the indicating plane is returned to the initial position, as shown in FIG. 18G.

Figure 19A:
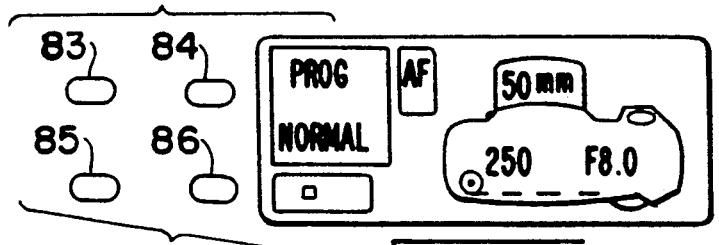
FIGS. 19A through 19C are schematic plan views of indicating planes indicating different information at a "POWERED ZOOM MODE"
Figure 19B:
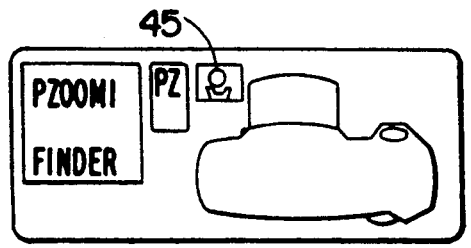
Figure 19C:
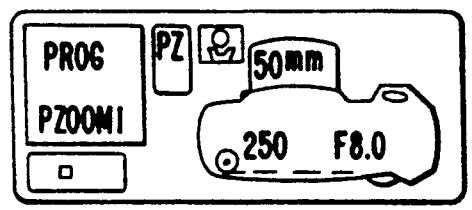

FIGS. 19A through 19C show an example of the operation when the "POWERED ZOOM MODE" is selected.

FIG. 19A shows an indication plane before the operation starts. When, the operational switch 84 is turned ON, the symbol "PZOOM 1 FINDER" is indicated in the dot LCD 23, as shown in FIG. 19B. At the same time, the information of the body indicating portion 44 is erased. The symbols "PZ" (which is an abbreviation for the "powered zoom") and "45" are indicated in the frame portion 22a.

When the operational switch 84 is turned OFF, the symbols "PZ" and "45" are maintained as they are in the frame portion 22a, and the indication of the dot LCD is changed to "PROG PZOOM 1". The other portions of the indicating plane are returned to the initial position shown in FIG. 19A and the setting operation is complete.

FIGS. 20A through 20E show an example of the operation when the "POWERED ZOOM MODE" is selected.

Figure 20A:
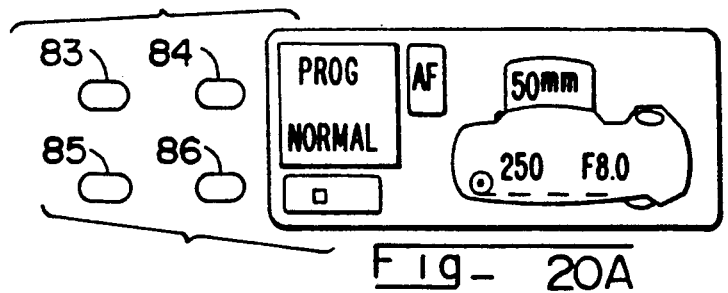
FIGS. 20A through 20E are schematic plan views of indicating planes indicating different information at a "POWERED ZOOM MODE"
Figure 20B:
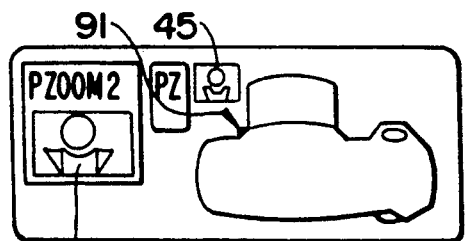
Figure 20C:
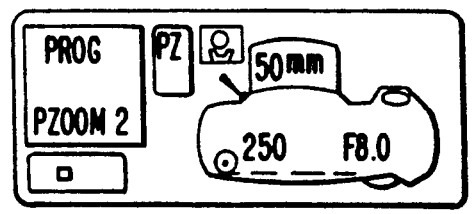

FIG. 20A shows an indication plane before the operation starts. When the operational switch 85 and the up-switch 97 or the down-switch 98 are turned ON, the indication is as shown in FIG. 20B corresponding to the "FINDER PICTURE SELECTION 1". Namely, the symbol "PZOOM 2" and the large symbol "45" are indicated in the dot LCD 23. At the same time, the small symbols "PZ" and "45" (on the right side of UP2) are indicated in the frame portion 22a. In this state, when the operational switch 85 and the up-switch 97 or the down switch 98, which were turned ON are turned OFF, the large symbol "PROG PZOOM 2" is indicated in the dot LCD 23, and the small symbols "PZ" and "45" are indicated in the frame portion 22a. The other information in the indication are same as those in the initial position shown in FIG. 20A and the setting operation is complete.

Figure 20D:
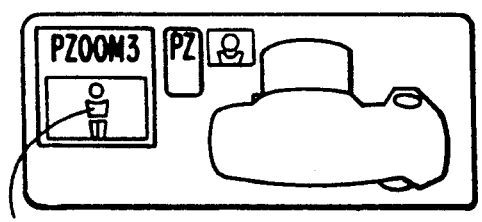
Figure 20E:
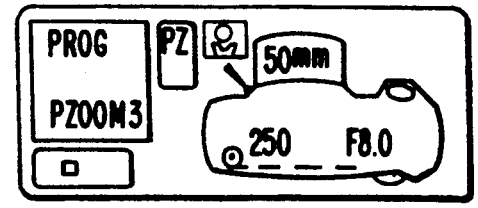

In FIG. 20A, when the up-switch 97 or the down-switch 98 is turned ON, and the operational switch 85 is turned ON to set a different mode, as shown in FIG. 20D, the indication of the indicating plane of the "FINDER PICTURE SELECTION 2" is obtained . In FIG. 20D, the symbols "PZOOM 3" and "45a" (which represents normal photographing) are indicated in the dot LCD 23. On the other hand, the small symbols "PZ" and "45A" are indicated in the frame portion 22a of the segment LCD 22. In this state, when the operational switch 85 and the up-switch 97 or the down switch 98, which were turned ON are turned OFF, the large symbol "PROG" and PZOOM 3 are indicated in the dot LCD 23, and the symbol "PZ" is indicated in the frame portion 22a. Also, the small symbol "45" is indicated next to the symbol "PZ". The other information in the indication are same as those in the initial position shown in FIG. 20A and the setting operation is complete.

Figure 21A:
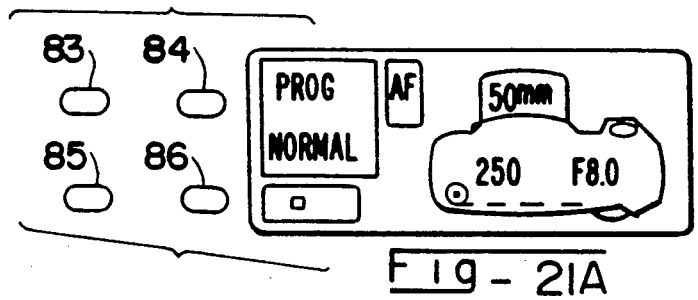
FIGS. 21A through 21C are schematic plan views of indicating planes indicating different information at a "ZOOMING OPERATION MODE"
Figure 21B:
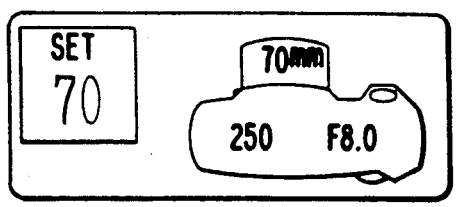
Figure 21C:
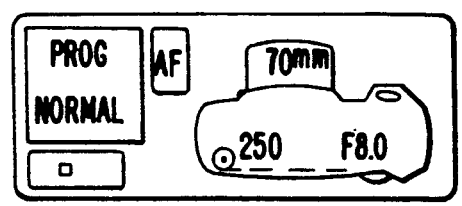

FIGS. 21A through 21C show an example of the operation when the "ZOOMING OPERATION MODE" is selected.

FIG. 21A shows an indication plane before the operation starts. When, the operational switch 85 is turned ON, for example the symbols "SET" and "70 mm" are indicated in the dot LCD 23, as shown in FIG. 21B. At the same time, the small symbol "70 mm" is also indicated in the lens portion of the segment LCD 22d. In this state, when the operational switch 85 is turned OFF, the indication of the lens portion is changed to "70 mm" and is returned to the initial position shown in FIG. 21A.

Figure 22A:
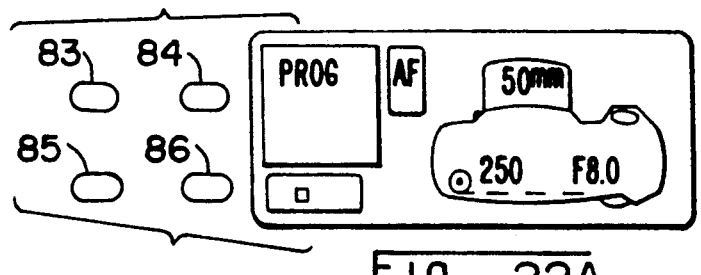
FIGS. 22A through 22D are schematic plan views of indicating planes indicating different information at a "BUZZER OPERATION MODE"
Figure 22B:
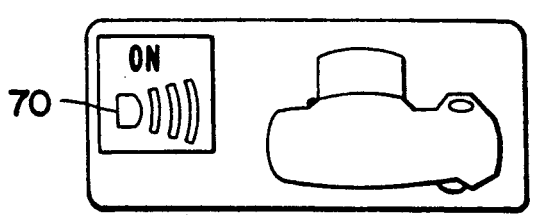
Figure 22C:
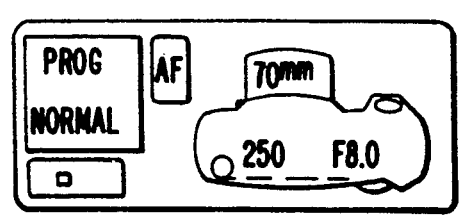

FIGS. 22A through 22C show an example of the operation when the "BUZZER OPERATION MODE" is selected.

FIG. 22A shows an indication plane before the operation starts. When, the operational switch 86 is turned ON, the large symbols "ON" and "70" (which represents the buzzer mode) are indicated in the dot LCD 23. After the lapse of a predetermined time, as shown in FIG. 22C, the indication is substantially returned to the initial position shown in FIG. 22A, so that the setting operation ends. Namely, the "BUZZER ON" mode is set, as shown in FIG. 22C.

Figure 22D:
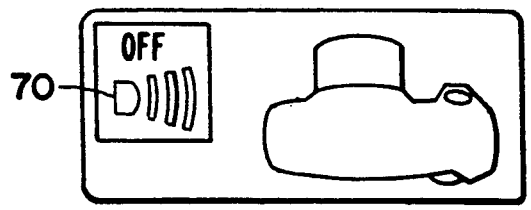

In FIG. 22A, when the operational switch 86 is turned OFF, the indication of the indicating plane changes, as shown in FIG. 22D, in which the large symbols "OFF" and "70" are indicated in the dot LCD 23. After the lapse of a predetermined time, the indication is returned to the position shown in FIG. 22C, so that the setting operation ends. Namely, the "BUZZER OFF" mode is set.

Figure 23A:
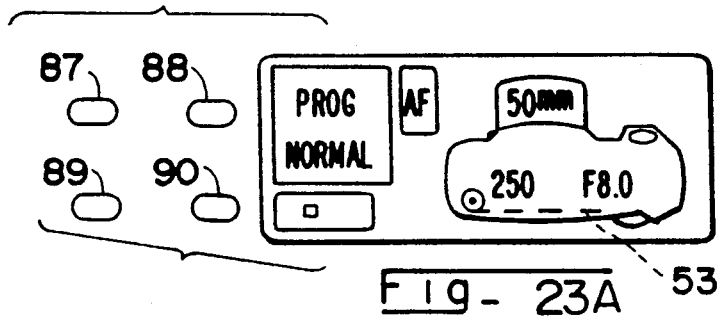
FIGS. 23A through 23G are schematic plan views of indicating planes indicating different information at a "LOADING OPERATION MODE"

FIGS. 23A through 22G show an example of the operation when the film is wound.

Figure 23B:
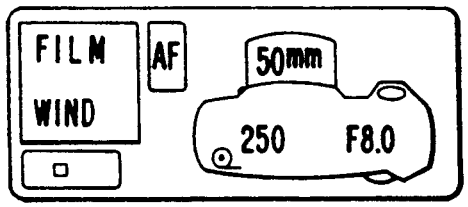
Figure 23C:
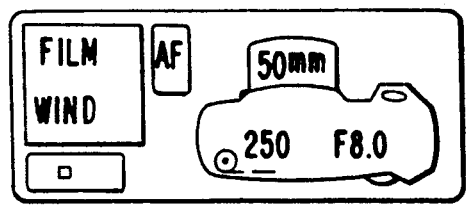
Figure 23D:
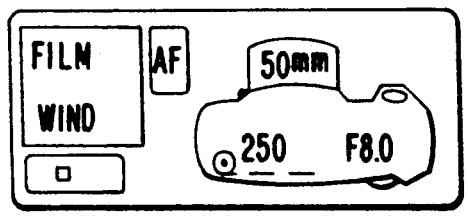
Figure 23E:
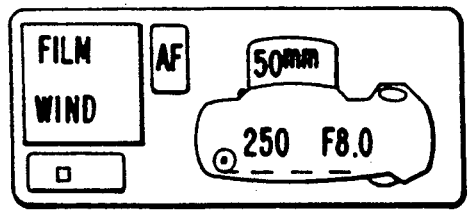
Figure 23F:
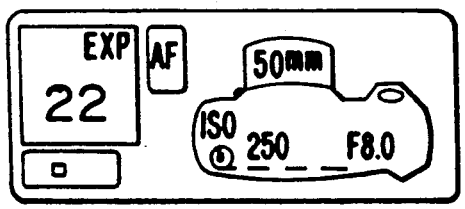
Figure 23G:
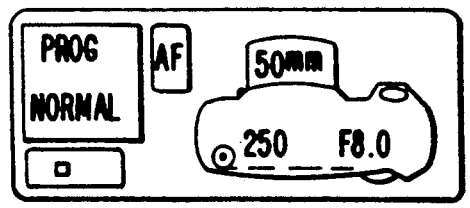

FIG. 23A shows an indication plane before the operation starts. After a new film patrone or cassette is loaded in the camera, when the operational switch 88 is turned ON, the motor begins rotating to wind the film. As a result, the indication of the indicating plane changes as shown in FIG. 23B, in which the large symbol "FILM WIND" is indicated in the dot LCD 23. The symbol "53" represented by the dotted line disappears. During the winding operation of the film, the length of the dotted line 53 changes, as shown in FIGS. 23C through 23E. Except for the length of the dotted line, no change of indication takes place. Upon the completion of the winding operation, for example, the large symbol "EXP 22" is indicated in the dot LCD 22, as shown in FIG. 23F. After the lapse of a predetermined time, the indication of the indicating plane is returned to the initial position.

Figure 24A:
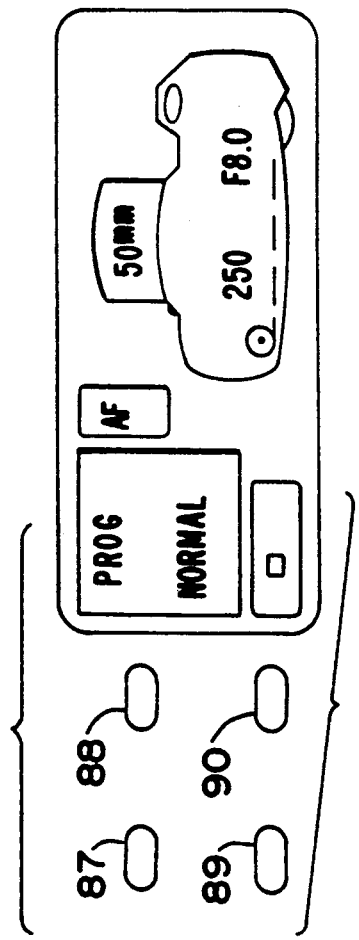
FIGS. 24A through 24C are schematic plan views of indicating planes indicating different information at a "LENS OPERATION MODE"
Figure 24C:
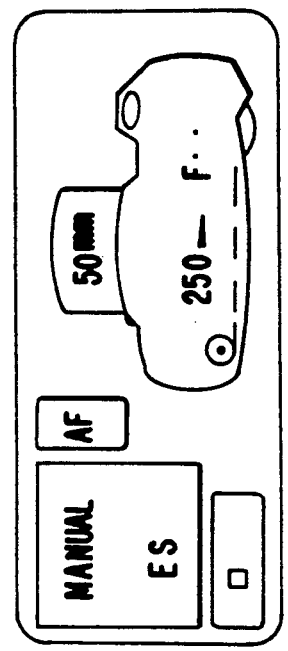
Figure 24B:
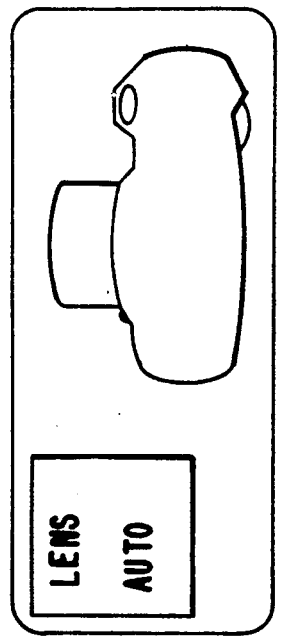

FIGS. 24A through 24C show an example of the operation when the lens is operated.

FIG. 24A shows an indication plane before the operation starts. When the operational switch 87 is turned OFF, the indication of the indicating plane changes as shown in FIG. 24B, in which the symbol "LENS AUTO" is indicated in the dot LCD 23. Thereafter, the symbol is changed to "LENS AUTO" to be set as the lens mode. After the lapse of a predetermined time, the symbol "MANUAL ES" is indicated, as shown in FIG. 24C.

At the "LENS MANUAL MODE", the initial indicating plane is as shown in FIG. 24C. In this state, when the operational switch 87 is turned ON to set the "LENS AUTO MODE", the "MANUAL ES" indicated in the dot LCD 23 is changed to "LENS AUTO" to complete the setting of the lens mode. After the lapse of a predetermined time, the indication is returned to the initial position shown in FIG. 24A.

FIGS. 25A through 25E show an example of the operation at the "BATTERY CHECK MODE".

Figure 25A:
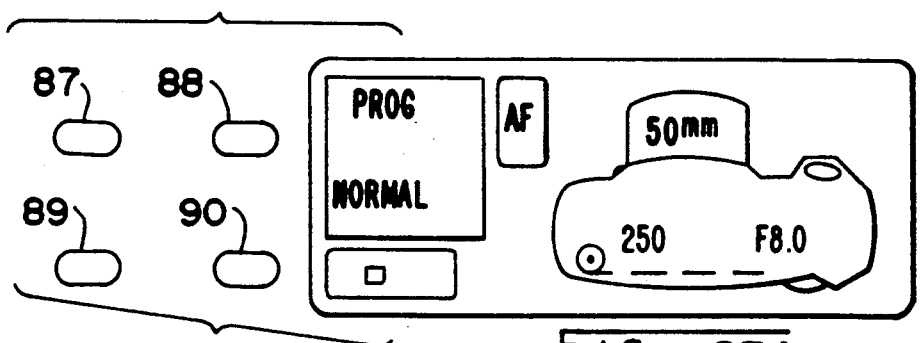
FIGS. 25A through 25E are schematic plan views of indicating planes indicating different information at a "BATTERY CHECK MODE"
Figure 25B:
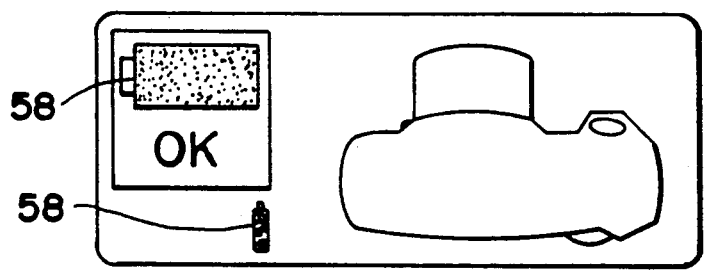

FIG. 25A shows an indication plane before the operation starts. When the operational switch 88 is turned ON, the large symbol "58" (which is represented by a battery mark entirely colored with black) is indicated in the dot LCD 23, as shown in FIG. 25B, if the battery level is full.

Also in FIG. 25B, the small battery mark 58 and the symbol "OK" are indicated below the large battery mark, so that the photographer can visually confirm the batter level. The information of the body indicating portion 44 disappears.

Figure 25C:
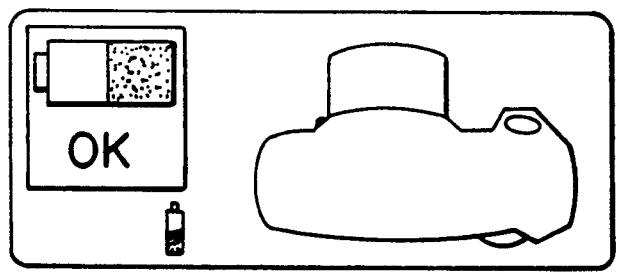
Figure 25D:
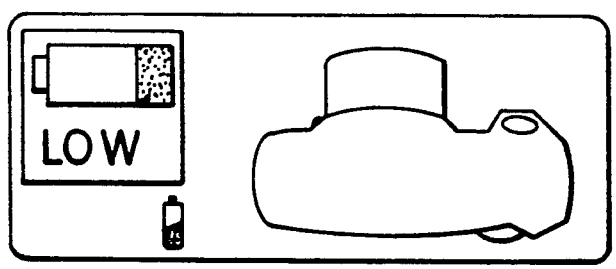

Upon turning the operational switch 88 ON, if the battery level is about half, as shown in FIG. 25C, the battery mark 58 (half of which is blackened) is indicated in the dot LCD 23. No information is indicated in the body indicating portion 44. Below the battery mark, the symbol "OK" is indicated to show that the battery can be still used.

If the battery level is low, the battery mark 58 (about one third of which is blackened) is indicated in the dot LCD 23. The symbol "LOW" is indicated below the battery mark 58. Thus, a photographer can learn that the battery level is low. It is possible to flicker the symbol "LOW" for warning. A smaller battery mark 58 similar to the large battery mark 58 mentioned above is indicated also in the segment LCD 22 below the dot LCD 23.

Figure 25E:
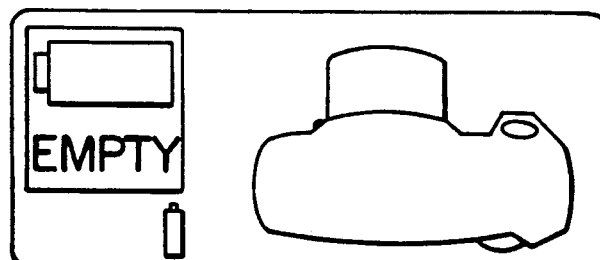

Upon turning the operational switch 88 ON, if the battery is almost completely consumed, so that no normal photographing can be guaranteed, the blank battery mark 58 and the symbol "EMPTY" are indicated in the dot LCD 23, as shown in FIG. 25E. A smaller blank battery mark 58 similar to the large blank battery mark 58 mentioned above is indicated also in the segment LCD 22 below the dot LCD 23.

Figure 26A:
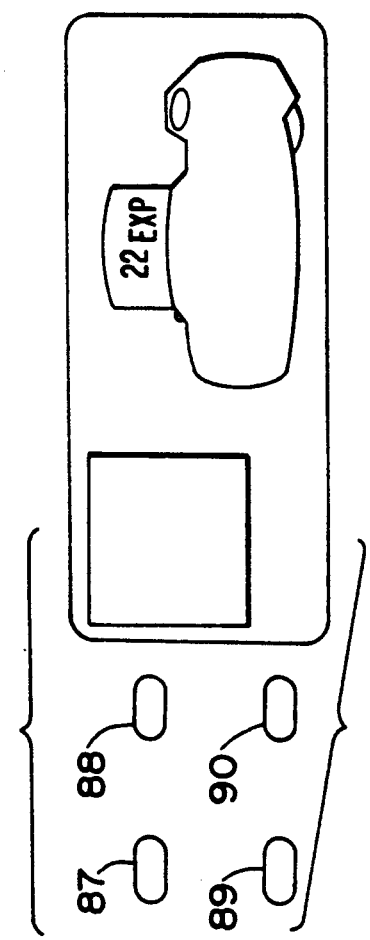
FIGS. 26A through 26C are schematic plan views of indicating planes when a system check is performed at a normal position of the camera.
Figure 26C:
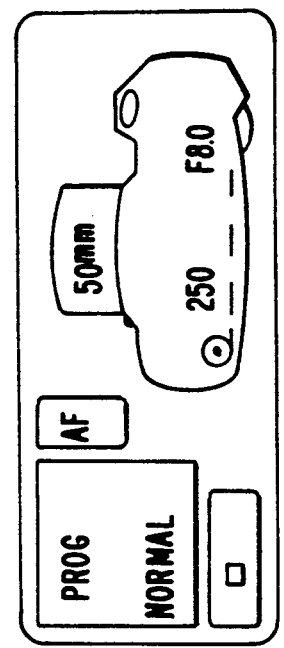
Figure 26B:
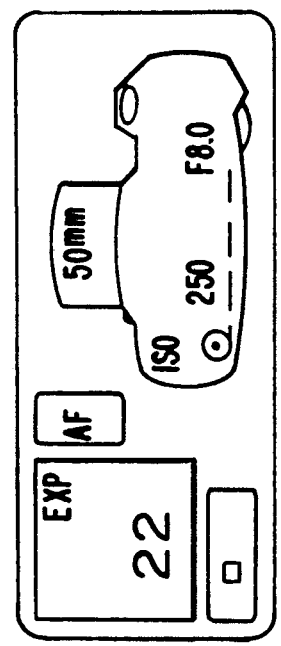

FIGS. 26A through 26C show an example of the operation when the system check is effected in the normal position of the camera.

In FIG. 26A, which shows an indication plane before the operation starts, no information is indicated in the dot LCD 23, and only the symbol "22 EXP" is indicated in the lens portion. In this state, when a power switch (not shown) or the operational switch 89 is turned ON, the symbol "22", which shows the number of frames of the film, is indicated in the dot LCD 23 for a predetermined time. At the same time, the symbols "AF" and 55 are indicated in the frame portions 22a and 22b, respectively. Also, the symbols "50 mm", "ISO" and "small circle 52 (representing the patrone) are indicated in the lens portion. After the lapse of a predetermined time, the indicating plane changes, as shown in FIG. 26C and the symbol "PROG NORMAL" is indicated in the dot LCD 23. The other indication is identical to that of FIG. 26B.

FIGS. 27A through 27F and FIGS. 28A through 28E show examples of the indicating planes at the "ABNORMAL OPERATION WARNING" mode.

Figure 27A:
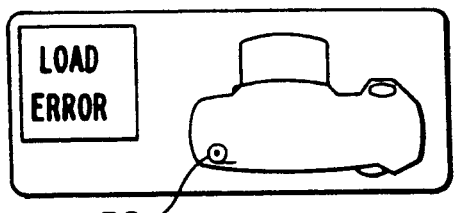
FIGS. 27A through 27F are schematic plan views of indicating planes at an error state of the camera.

If there is a loading error, for example, when the perforations of the film fail to engage with the associated sprocket teeth, based on the error detecting device 95, the initial indicating plane is as shown in FIG. 27A. In which case, all the information in the lens portion, the body indicating portion 44 the frame portions 22a and 22b disappear, except for the small circle 52 indicated in the body indicating portion 44. At the same time, the symbol "LOAD ERROR" is indicated in the dot LCD 23 to show the error in loading.

Figure 27D:
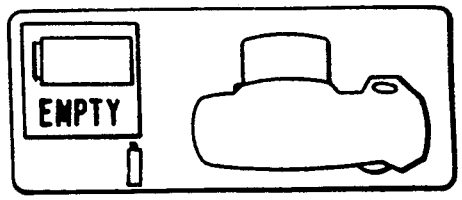
Figure 27B:
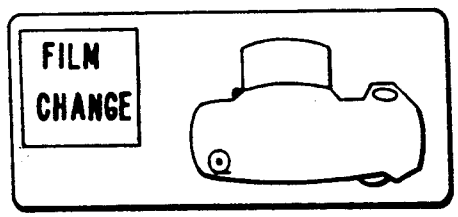
Figure 27E:
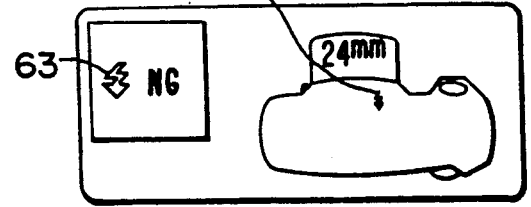

When the film which is wound is not taken out, based on the error detecting device 95, the small circle 52 is indicated in the body indicating portion 44 and the "FILM CHANGE" is indicated in the dot LCD 23 to warn the film exchange, as shown in FIG. 27B.

Figure 27C:
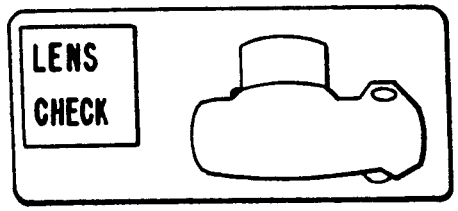

If the lens is detached, that is, if the lens is incompletely attached to the camera body, so that no electrical connection is established between the CPU 24 and the lens ROM 35, based on the error detecting device 95, the "LENS CHECK" is indicated in the dot LCD 23, as shown in FIG. 27C.

If there is a shortage of the battery voltage, based on the error detecting device 95, the blank battery mark 58 and the symbol "EMPTY" are indicated in the dot LCD 23. The smaller blank battery mark 58 is also indicated below the dot LCD 23, as shown in FIG. 27D.

When photographing and using the strobe (strobe-photographing), if the angle of view exceeds the range covered by the strobe because of the short focal length of the lens, based on the error detecting device 95, the large symbols, "63" and "NG" are indicated in the dot LCD 23. In addition the small symbols "24 mm" and "63" are indicated in the lens portion and the body indicating portion 44 respectively.

Figure 27F:
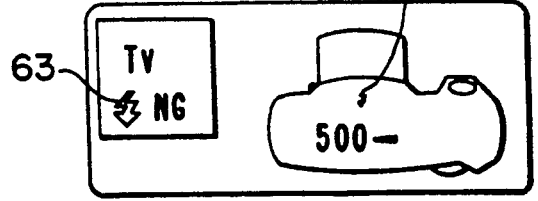

Upon strobe-photographing using, if the manual Tv value is set to be larger than the synchro speed, resulting in abnormal strobe-photographing, the large symbols "Tv", "63" and "NG" are indicated in the dot LCD 23, as shown in FIG. 27F. The small symbol "63" is also indicated in the body indicating portion 44.

Figure 28A:
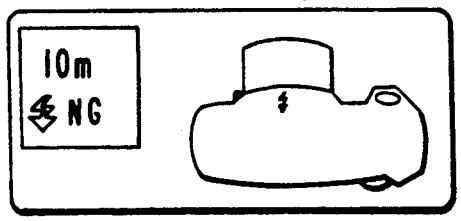
FIGS. 28A through 28E are schematic plan views of different indicating planes at an error state of the camera.

Upon strobe-photographing, if the object distance exceeds the distance within which the strobe light can reach, thus resulting in abnormal strobe-photographing, in spite of the object being in focus, for example, the large symbols "10 m", "63" and "NG" are indicated in the dot LCD 23, as shown in FIG. 28A. The small symbol "63" is also indicated in the body indicating portion 44.

Figure 28C:
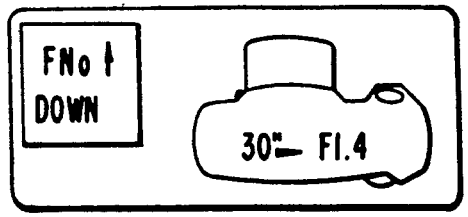
Figure 28B:
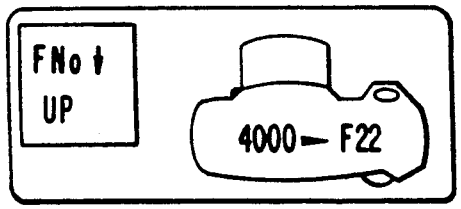

Upon the manual ES-photographing, if exposure becomes excessive at the manual set diaphragm value because the object to be photographed is too light, the large symbol "FNo. ↓ UP" is indicated in the dot LCD 23 to warn a photographer to increase the F-number, as shown in Fig. 28B. At the same time, the symbol "4000 ► F22" is indicated in the body indicating portion 44.

Upon the manual ES-photographing, if normal photographing cannot be achieved because of a too small Av value, the large symbol "FNo. ↑ DOWN" is indicated in the dot LCD 23 to warn a photographer to reduce the F-number, as shown in FIG. 28C. At the same time, the symbol "30 ► F1.4" is indicated in the body indicating portion 44.

Figure 28D:
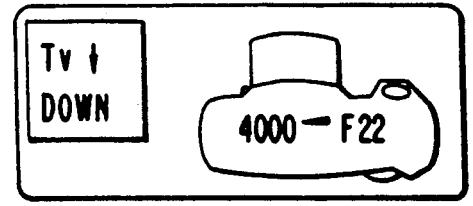

Upon photographing at an automatic exposure, if exposure becomes excessive because the object to be photographed is too light, the large symbol "Tv ↓ DOWN" is indicated in the dot LCD 23 to warn a photographer to shorten the exposure time (i.e., increase the shutter speed) as shown in FIG. 28D. At the same time, the symbol "4000 ◄ F22" is indicated to indicate the Tv value and the Av value in the body indicating portion 44.

Figure 28E:
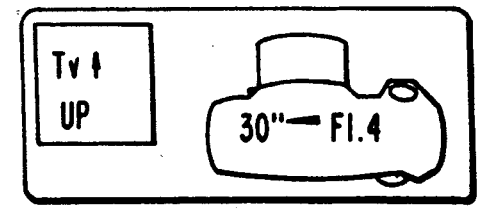

Upon photographing at an automatic exposure, if normal photographing cannot be achieved because of a too small Tv value, the large symbol "Tv ↑ UP" is indicated in the dot LCD 23 to warn a photographer to increase the Tv value, as shown in FIG. 28E. At the same time, the symbol "30 ◄ F1.4" is indicated in the body indicating portion 44.

FIGS. 29A through 29F show examples of indicating planes when the system check is effected at the abnormal (error) state of the camera, directed to some of the examples of errors mentioned above, shown in FIGS. 27A through 27F and 28A through 28E.

Figure 29A:
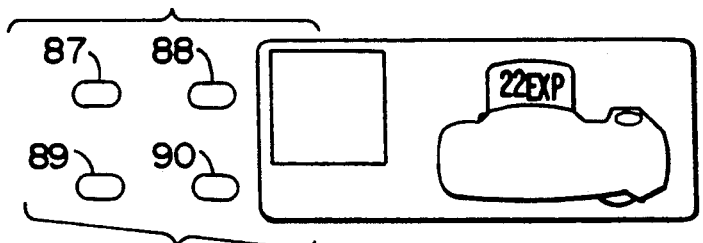
FIGS. 29A through 29F are schematic plan views of indicating planes when a system check is performed at an error state of the camera.
Figure 29B:
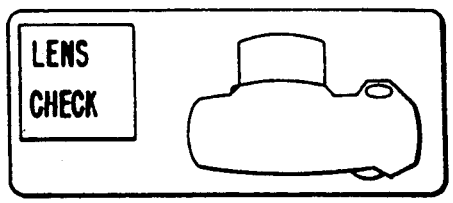
Figure 29E:
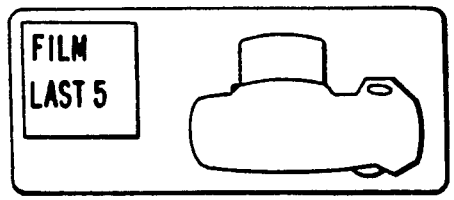
Figure 29C:
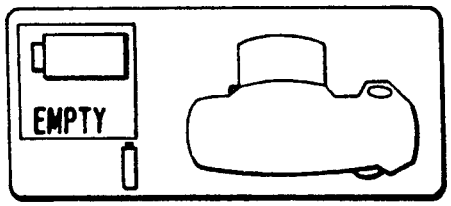
Figure 29D:
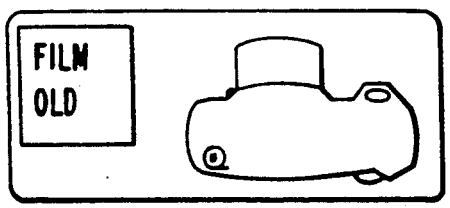
Figure 29F:
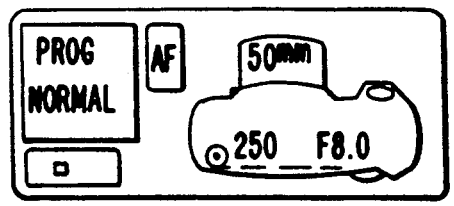

In FIG. 29A which shows an initial position before the operation begins, only the symbol "22 EXP" is indicated in the lens portion. The other information disappear. For instance, if the lens portion is disengaged from the camera body, when the power switch (not shown) or the operational switch 89 is turned ON, the large symbol "LENS CHECK" is indicated in the dot LCD 23 by the error indication control device 96, which operates in accordance with the error detecting means 95. When the photographer notices it, the operational switch 90 is turned ON to return the indication to a normal indication.

In FIG. 29A, for example, if there is an error (a shortage of battery voltage, etc.) in battery voltage, when the power switch (not shown) or the operational switch 89 is turned ON, the large blank battery mark 58 and the symbol "EMPTY" are indicated in the dot LCD 23 by the error indication control device 96 which operates in accordance with the error detecting device 95. At the same time, the small blank battery mark 58 is indicated below the dot LCD 23. When the photographer notices it, the operational switch 90 is turned ON to return the indication to a normal indication.

In FIG. 29A, for example, if the film is too old to use (the loading date of the film is memorized in the memory of the camera) when the switch 89 is turned ON, the large symbol "FILM OLD" is indicated in the dot LCD 23, and the small circle 52 representing the patrone is indicated in the body indicating portion 44. When the photographer notices it, the operational switch 90 is turned ON to return the indication to a normal indication.

In FIG. 29A, when there is only a few number of frames of film (e.g., less than 6 frames) the large symbol "FILM LAST 5" is indicated in the dot LCD 23 to show the number of the remaining frames being 5. At the same time, all information in the lens portion disappear. When the photographer notices it, the operational switch 90 is turned ON and the symbol "FILM LAST 5" is erased to be returned to the normal indication.

Thus, if there is an error in the camera function, the photographer can visually confirm the cause of the error.

The control of the indication of the LCD's 23 and 22 will be explained below in detail with reference to the flow charts shown in FIGS. 30 through 37.

Figure 30:
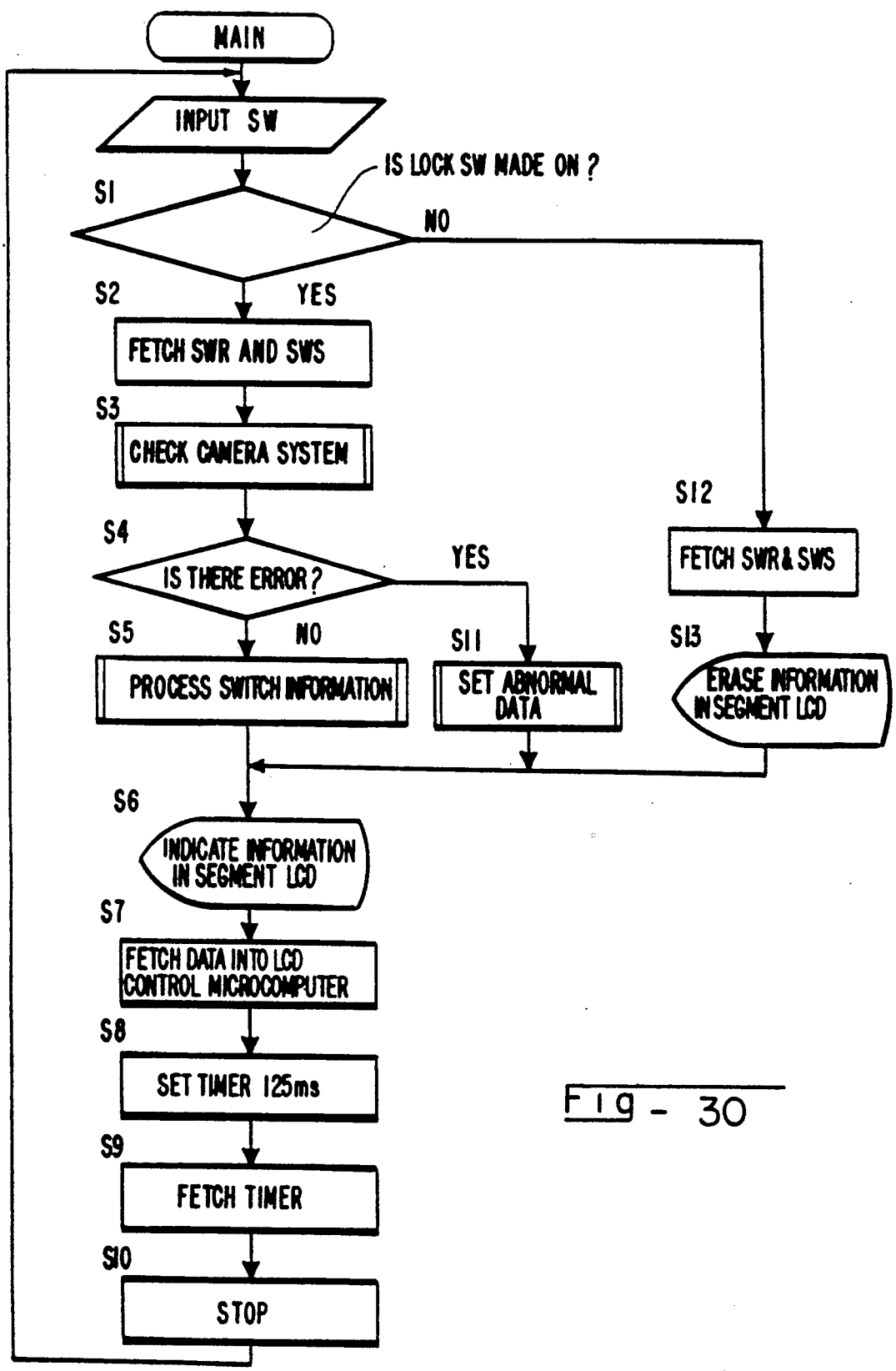
FIG. 30 is a diagram showing a flow chart of a main routine of a control unit of an indicating apparatus according to the present invention.

In FIG. 30 which shows a main flow chart of the operation, when the main switch (not shown) is turned ON, the status (ON or OFF) of the lock switch 28 is checked (step S1). If the lock switch 28 is turned ON, the control proceeds to step S2 at which the controls of the release switch 30 and the photometer switch 29 can be fetched. If the lock switch 28 is not made ON, the control proceeds to step S12, at which the control signals from neither the release switch 30 nor the photometer switch 29 can be fetched. Thereafter, the control proceeds to step S13, at which all information of the segment LCD 22 are erased. After that, the control proceeds to step S7.

At step S3, the sub-routine for the "CAMERA SYSTEM CHECK" is performed. Whether or not there is an error in the camera system is checked in accordance with the result of the camera system check (step S4). If there is an error, the sub-routine for the "ABNORMAL DATA", to indicate the abnormal data on the segment LCD 22 and the dot LCD 23, is initiated (step S11). Thereafter, the control proceeds to step S6. If there is no error at step S4, the sub-routine for the "SWITCH INFORMATION PROCESSING" operation is performed to indicate the various data corresponding to "NO ERROR" in the segment LCD 22, so that the control is fetched in the LCD controlling microcomputer 39 (step S7). Thereafter, at step S8, the timer is set to 125 ms, so that an A-loop is performed every 125 ms. The A-loop is a main routine which performs intermittently(i.e. period is determined by step 8) by the operation of timer. Thereafter, the operation of the timer can be fetched at step S9 and the control stops at step 10.

Figure 31:
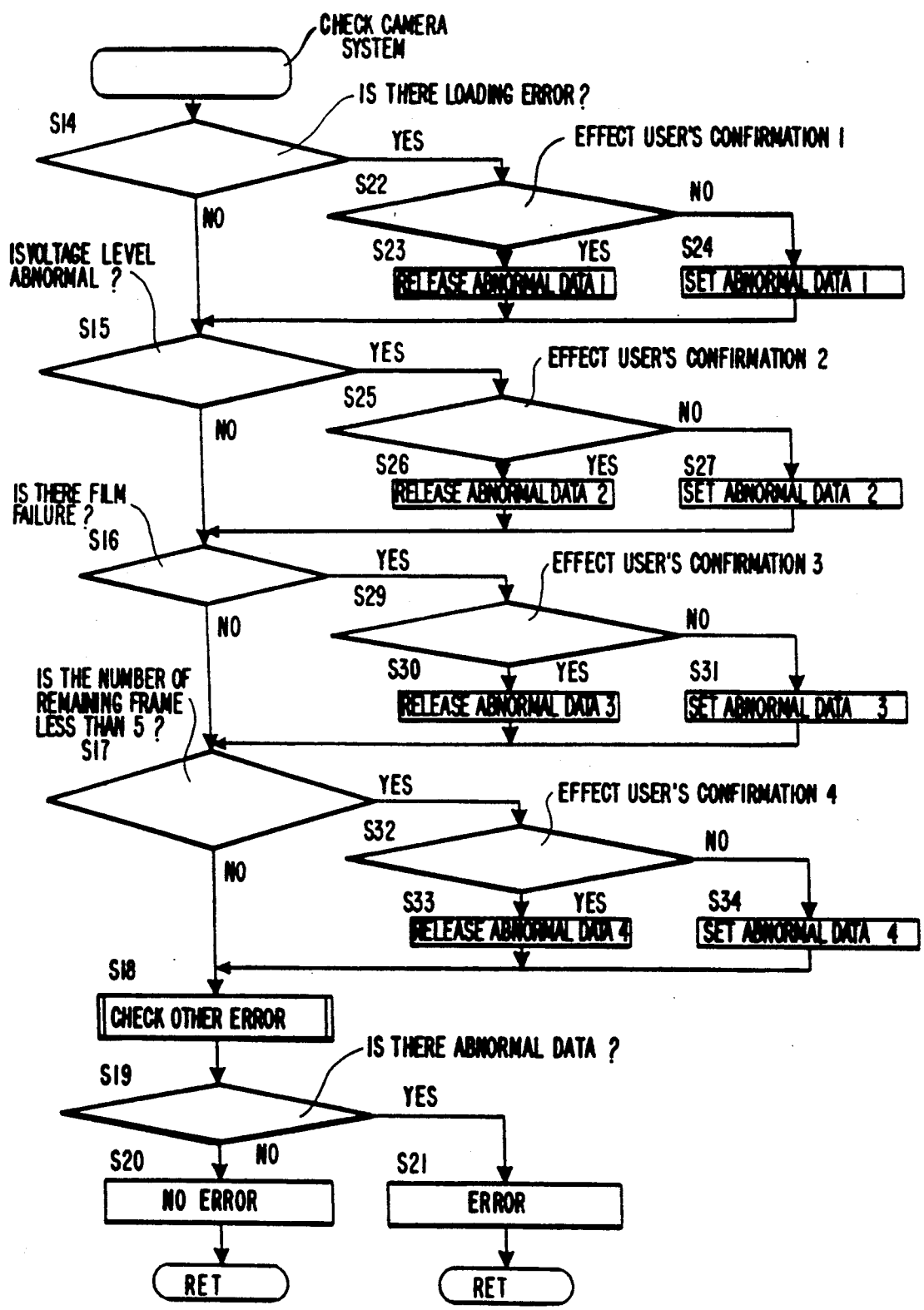
FIG. 31 is a diagram showing a flow chart of a subroutine of a "CAMERA SYSTEM CHECK"

FIG. 31 shows the sub-routine for the "CAMERA SYSTEM CHECK" at step S3.

Whether there is an error in the film loading is checked at step S14 in the CPU 24. If there is an error, the control proceeds to step S22. If there is no error, the battery level is checked at step S15. If there is an error in the battery level (i.e., if the battery level is below a predetermined level) the control proceeds to step S25. If there is no error at step S15, the error of the film (e.g. whether or not the film is too old to be used, etc.) is checked at step S16. If there is an error at step S16, the control proceeds to step S29. If there is no error at step S16, whether the number of the remaining frames of the film is above 5 is checked at step S17. If the number is not more than 5, the control proceeds to step S32. If the number is more than 5, other error is checked at step S18. If there is an error at step S18, the control proceeds to step S21 to process the control for the "presence of an error" at step S21. If there is no other error at step S18, the control is processed as "no error", (step S20).

At step S22, whether or not the "USER CONFIRMATION 1" should be performed is checked. If the "USER CONFIRMATION 1" is not performed, the "ABNORMAL DATA 1" is set to indicate the abnormal state at step S24. If there is an indication of abnormal data in the indicating plane, and when the photographer turns the confirmation switch (e.g. the operational switch 90) ON, or when a predetermined time lapses, the "ABNORMAL DATA 1" is released (step S23).

At step S25, whether or not the "USER CONFIRMATION 2" should be performed is checked. If the "USER CONFIRMATION 2" is not performed, the "ABNORMAL DATA 2" is set to indicate the abnormal state at step S27. If there is an indication of abnormal data in the dot LCD 23 or the segment LCD 22, and when the photographer turns the confirmation switch (the operational switch 90) ON, or when a predetermined time lapses, the "ABNORMAL DATA 2" is released (step S26).

At step S29, whether or not the "USER CONFIRMATION 3" should be performed is checked. If the "USER CONFIRMATION 3" is not performed, the "ABNORMAL DATA 3" is set to indicate the abnormal state at step S31. If there is an indication of abnormal data in the dot LCD 23 or the segment LCD 22, and when the photographer turns the confirmation switch (the operational switch 90) ON, or when a predetermined time lapses, the "ABNORMAL DATA 3" is released (step S30).

At step S32, whether or not the "USER CONFIRMATION 4" should be performed is checked. If the "USER CONFIRMATION 4" is not performed, the "ABNORMAL DATA 4" is set to indicate the abnormal state at step S34. If there is an indication of abnormal data in the dot LCD 23 or the segment LCD 22, and when the photographer turns the confirmation switch (the operational switch 90) ON, or when a predetermined time lapses, the "ABNORMAL DATA 4" is released (step S33).

Figure 32:
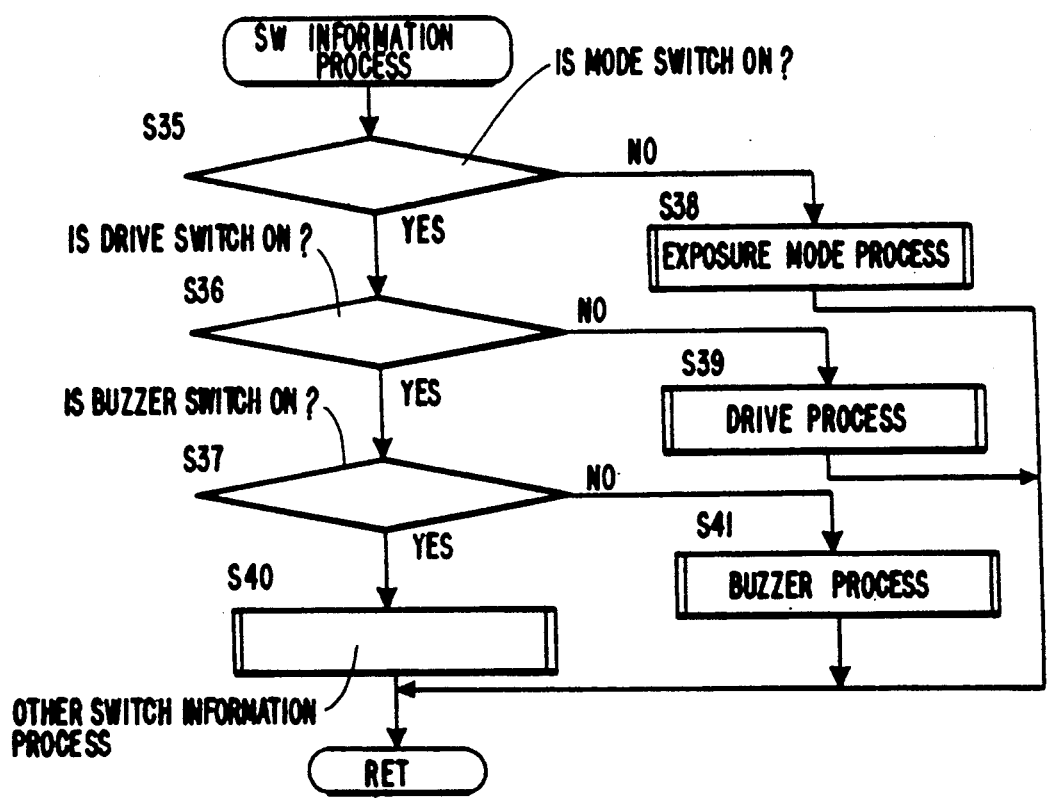
FIG. 32 is a diagram showing a flow chart of a subroutine of a "SWITCH INFORMATION PROCESS"

The following discussion will be directed to the "SWITCH INFORMATION PROCESS" at step S5, with reference to FIG. 32.

At step S35, whether or not the mode switch (operation switch 71) is turned ON is checked. If the mode switch is not turned ON, the control proceeds to step S38 to perform the sub-routine of the "EXPOSURE MODE PROCESS" and is then returned. During the exposure mode process, other information indicated in the segment LCD 22 are not erased.

If the mode switch is turned ON, whether or not the drive step S36. If the drive switch is turned ON, the control proceeds to step S39 to perform the sub-routine of the "DRIVE PROCESS". During the drive process, the information indicated in the segment LCD 22 are erased.

If the drive switch is turned ON, whether or not the buzzer switch (operational switch 76) is turned ON is checked at step S37. If the buzzer switch is not turned ON, the control proceeds to step S41 to perform the sub-routine of the "BUZZER PROCESS". During setting the buzzer process mode, the symbol "70" of the buzzer mode is indicated in the dot LCD 23. However, the symbol "70" is erased as soon as the setting of the buzzer mode is finished. If the buzzer switch is turned ON, the sub-routine of the "OTHER SWITCH INFORMATION PROCESS" is performed at step S40 and the control is returned.

Figure 33:
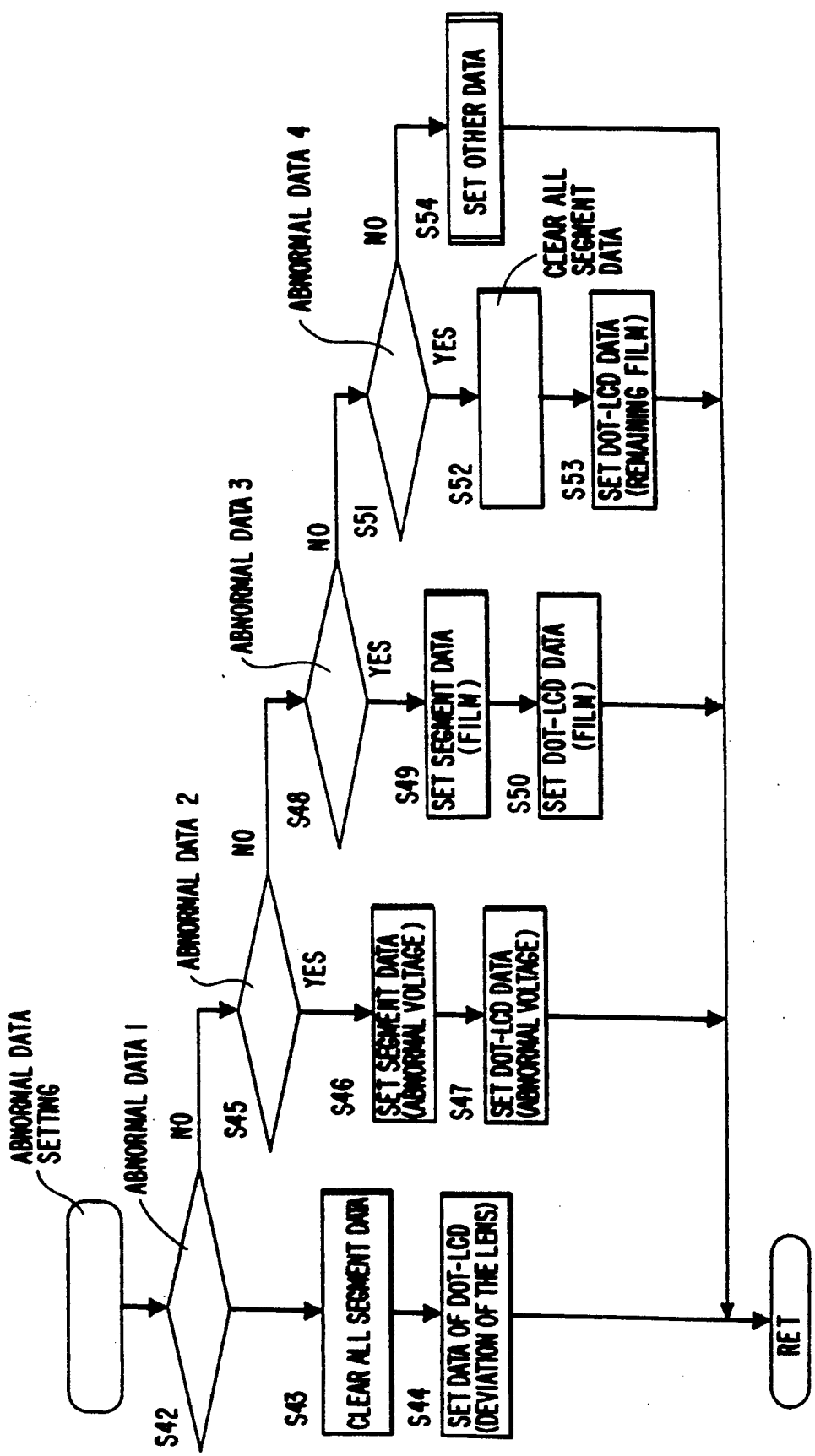
FIG. 33 is a diagram showing a flow chart of a subroutine of an "ABNORMAL DATA SET"

The "ABNORMAL DATA SET" at step S11 will be discussed below in detail with reference to FIG. 33.

At step S4, if there is an error in the camera system, the "ABNORMAL DATA" is performed. In this case whether or not the "ABNORMAL DATA 1" should be applied is checked, at step S42. If the "ABNORMAL DATA 1" is judged to be lied, the control proceeds to step S43. Conversely, if the "ABNORMAL DATA 1" is not applied, the control proceeds to step S45.

At step S43, the data (information) indicated in the segment LCD 22 are all cleared. Thereafter, the control proceeds to step S44 in which the data for warning the disengagement of the lens from the camera body are indicated in the dot LCD 23.

At step S45, whether or not the "ABNORMAL DATA 2" should be applied is checked. If the "ABNORMAL DATA 2" is judged to be applied, the control proceeds to step S46. Conversely, if the "ABNORMAL DATA 2" is not applied, the control proceeds to step S48.

At step S46, the information for showing the error of the battery level are indicated in the segment LCD 22. Furthermore, the information for showing the error of the battery level is indicated in the dot LCD 23, at step S47.

At step S48, whether or not the "ABNORMAL DATA 3" should be applied is checked. If the "ABNORMAL DATA 3" is judged to be applied, the control proceeds to step S49. Conversely, if the "ABNORMAL DATA 3" is not applied, the control proceeds to step S51.

At step S49, the information for showing the film error (film is too old to be used) are indicated in the segment LCD 22. Furthermore, the same information is indicated in the dot LCD 23, at step S50.

At step S51, whether or not the "ABNORMAL DATA 4" should be applied is checked. If the "ABNORMAL DATA 4" is judged to be applied, the control proceeds to step S52. Conversely, if the "ABNORMAL DATA 4" is not applied, the control proceeds to step S54 to perform the sub-routine of the "OTHER DATA PROCESS".

At step S52, the information in the segment LCD 22 are all erased. Thereafter, the number of the remaining frames of the film is indicated at step S53.

Figure 34:
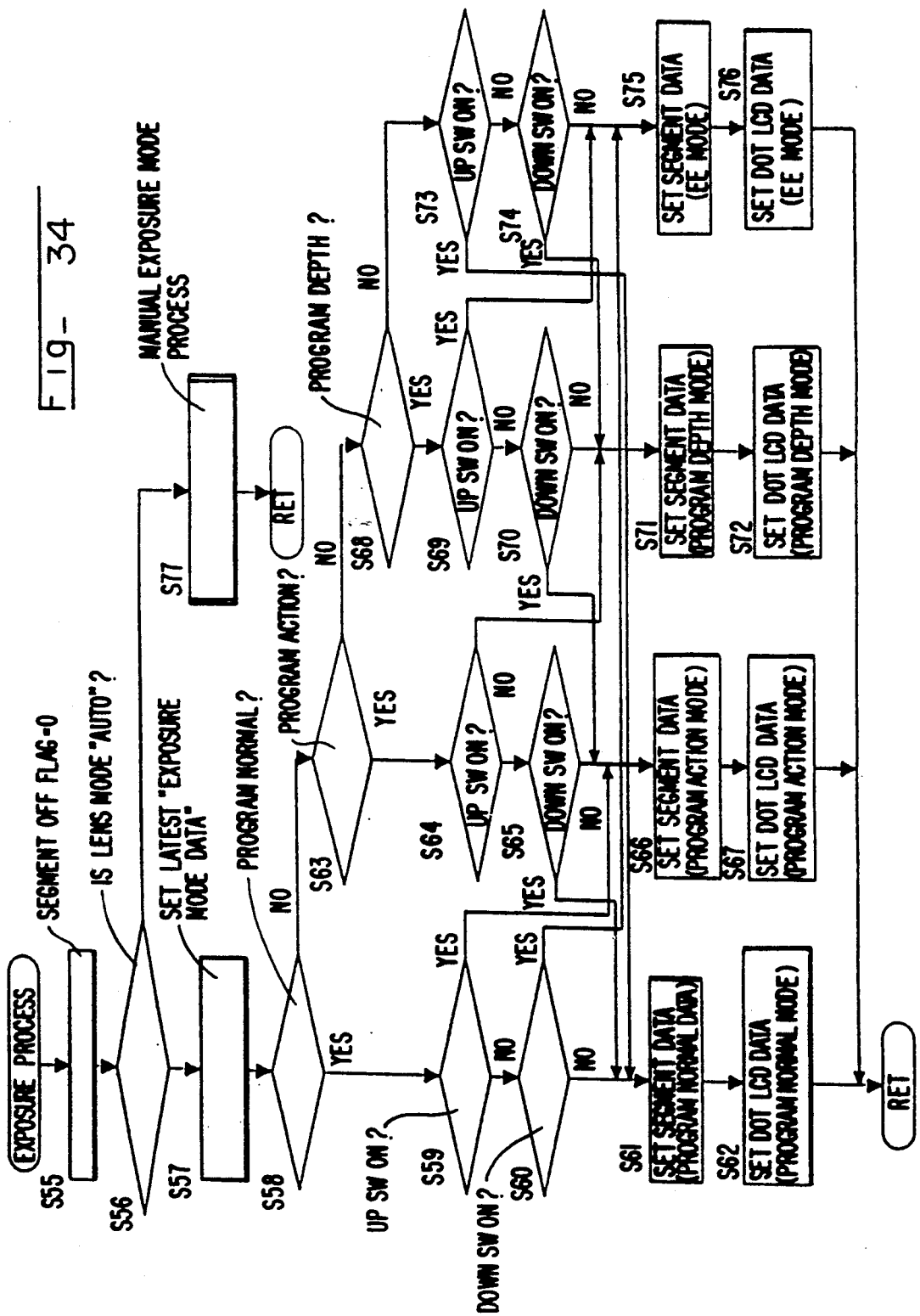
FIG. 34 is a diagram showing a flow chart of a subroutine of an "EXPOSURE MODE PROCESS"

The "EXPOSURE MODE PROCESS at step S38 will be described below (See FIG. 34).

When the segment OFF flag is "0", whether or not the mode is "AUTO" is checked (step S55 and S56). If the lens mode is not "AUTO", the control proceeds to step S77 to perform the sub-routine of the "MANUAL EXPOSURE MODE" and then returned. If the lens mode is switched to "AUTO", the latest "EXPOSURE MODE DATA", is set in the segment LCD 22(step S57). Whether or not the program is "NORMAL" is checked at step S58. If the program is not "NORMAL", the control proceeds to step S63 and if the program is "NORMAL", the control proceeds to step S59 to check whether the up-switch 89 is turned ON. If the up-switch 89 is turned ON, the control proceeds to step S66. Conversely, if the up-switch 89 is not turned ON, whether or not the down-switch 90 is turned ON is checked at step 60. If the down-switch 90 is made ON, the control proceeds to step S75. Conversely, if the down-switch 90 is not turned ON, the control proceeds to step S61 to indicate the information corresponding to the "PROGRAM NORMAL" in the segment LCD 22. Thereafter, the information corresponding to the "PROGRAM NORMAL" is indicated in the dot LCD 23 at step S62.

At step S63, whether or not the program is "PROGRAM ACTION" is checked. If the program is not the "PROGRAM ACTION", the control proceeds to step S68. If the program is the "PROGRAM ACTION", the control proceeds to step S64 to check whether or not the up-switch 89 is turned ON. If the up-switch 89 is turned ON, the control proceeds to step S71. Conversely, if the up-switch 89 is not turned ON, whether or not the down-switch 90 is turned ON is checked at step 65. If the down-switch 90 is turned ON, the control proceeds to step S61. Conversely, if the down-switch 90 is not turned ON, the control proceeds to step S66 to indicate the information corresponding to the "PROGRAM ACTION" in the segment LCD 22. Thereafter, the information (the enlarged symbol "46" etc.) corresponding to the "PROGRAM ACTION" are indicated in the dot LCD 23 at step S67.

At step S68, whether or not the program is "PROGRAM DEPTH" (depth of field priority program) is checked. If the program is not the "PROGRAM DEPTH", the control proceeds to step S73. If the program is the "PROGRAM DEPTH" the control proceeds to step S69 to check whether or not the up-switch 89 is turned ON. If the up-switch 89 is turned ON, the control proceeds to step S75. Conversely, if the up-switch 89 is not turned on, whether or not the down-switch 90 is turned ON is checked at step 70. If the down-switch 90 is turned ON, the control proceeds to step S66. Conversely, if the down-switch 90 is no not turned ON, the control proceeds to step S71 to indicate the information corresponding to the "PROGRAM DEPTH" in the segment LCD 22. Thereafter, the information (the enlarged symbol "47", etc.) corresponding to the "PROGRAM DEPTH" are indicated in the dot LCD 23 at step S72.

At step S73, whether or not the up-switch 89 is turned ON is checked. If the up-switch 89 is turned ON, the control proceeds to step S61. Conversely, if the up-switch 89 is not turned ON, whether or not the down-switch 90 is turned ON is checked at step 74. If the down-switch 90 is turned ON, the control proceeds to step S71. Conversely, if the down-switch 90 is not turned ON, the control proceeds to step S75 to indicate the information corresponding to the "SHUTTER PRIORITY MODE" in the segment LCD 22. Thereafter, the information corresponding to the "SHUTTER PRIORITY MODE" are indicated in the dot LCD 23 at step S76.

Figure 35:
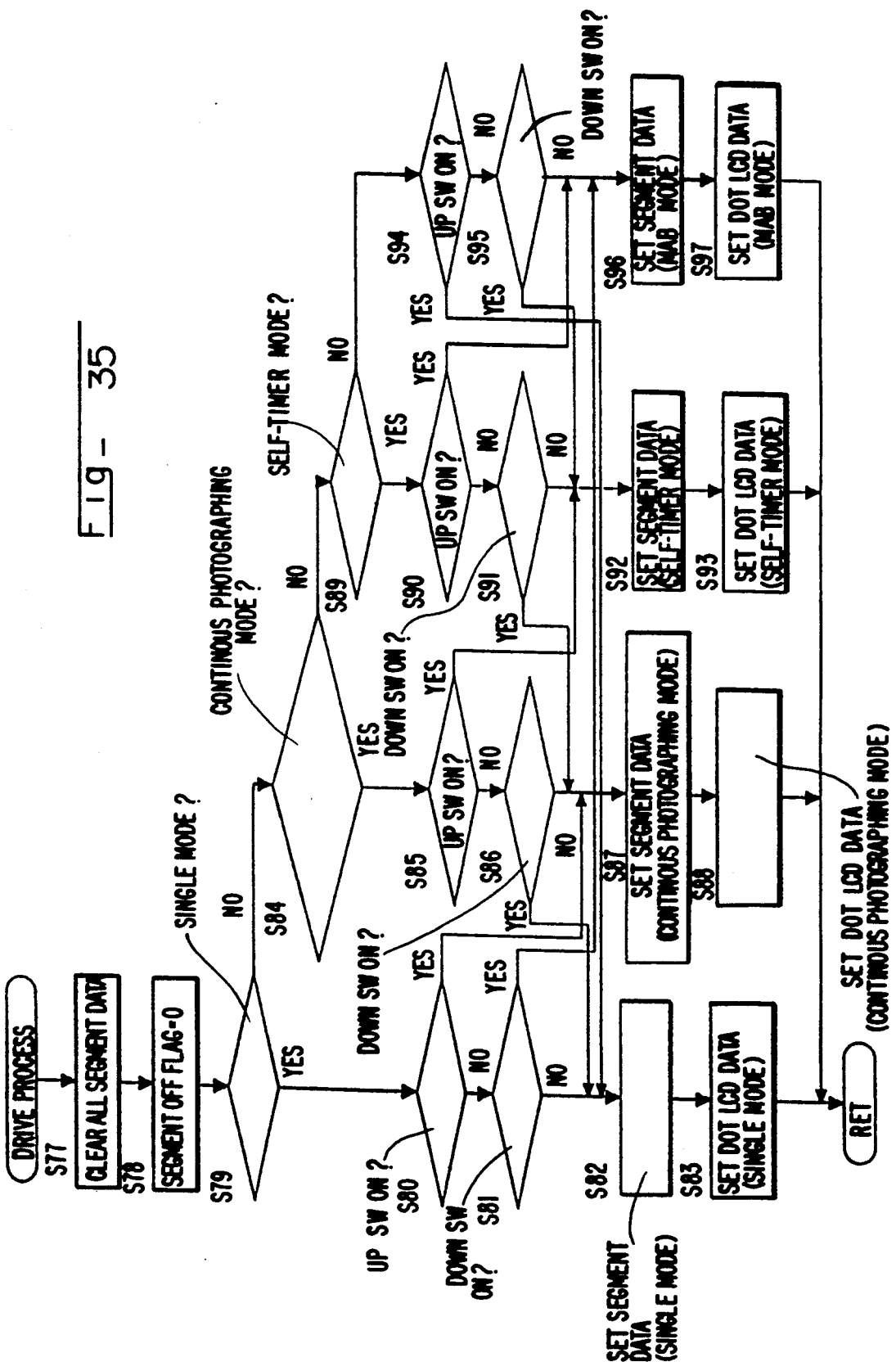
FIG. 35 is a diagram showing a flow chart of a subroutine of a "DRIVE PROCESS"

The "DRIVE PROCESS" at step S39 will be described below in detail (See FIG. 35).

The "DRIVE PROCESS" is performed in the CPU 24. The data of the segment LCD 22 are all cleared in accordance with the actuation of the operational switch 73. Thereafter, the segment OFF flag is set to "0" (step S78), and whether or not the lens mode is "SINGLE MODE" is checked at step S79. If the lens mode is not the "SINGLE MODE", the control proceeds to step S84. If the lens mode is the "SINGLE MODE", whether or not the up-switch 89 is turned ON is checked at step S80. If the up-switch 89 is turned ON, the control proceeds to step S87. Conversely, if the up-switch 89 is not turned ON, whether or not the down-switch 90 is turned ON is checked at step 81. If the down-switch 90 is turned ON, the control proceeds to step S96. Conversely, if the down-switch 90 are turned ON, the control proceeds to step S82 to set the indicating plane so as to correspond to the "SINGLE MODE" in the segment LCD 22 (Note: no information is actually indicated in the segment LCD 22). Thereafter, the information (the enlarged symbol "55", etc.) corresponding to the "SINGLE MODE" is indicated in the dot LCD 23 at step S83.

At step S84, whether the mode is "CONTINUOUS PHOTOGRAPHING MODE" is checked. If the mode is not the "CONTINUOUS PHOTOGRAPHING MODE", the control proceeds to step S89. If the lens mode is the "CONTINUOUS PHOTOGRAPHING MODE", whether or not the up-switch 89 is turned ON is checked at step S85. If the up-switch 89 is turned ON, the control proceeds to step S92. Conversely, if the up-switch 89 is not turned ON, whether the down-switch 90 is turned ON is checked at step 86. If the down-switch 90 is turned ON, the control proceeds to step S82. Conversely, if the down-switch 90 is turned ON, the control proceeds to step S87 to set the indicating plane so as to correspond to the "CONTINUOUS PHOTOGRAPHING MODE" in the segment LCD 22 (Note: no information is actually indicated in the segment LCD 22). Thereafter, the information (the enlarged symbol "56", etc.) corresponding to the "CONTINUOUS PHOTOGRAPHING MODE" are indicated in the dot LCD 23 at step S88.

At step S89, whether or not the mode is "SELF-TIMER MODE" is checked. If the mode is not the "SELF-TIMER MODE", the control proceeds to step S94. If the lens mode is the "SELF-TIMER MODE", whether or not the up-switch 89 is turned ON is checked at step S90. If the up-switch 89 is turned ON, the control proceeds to step S96. Conversely, if the up-switch 89 is turned ON, whether or not the down-switch 90 is turned ON is checked at step S91. If the down-switch 90 is made ON, the control proceeds to step S87. Conversely, if the down-switch 90 is not turned ON, the control proceeds to step S92 to indicate the information corresponding to the "SELF-TIMER MODE" in the segment LCD 22. Thereafter, the information (the enlarged symbol "54", etc.) corresponding to the "SELF-TIMER MODE" are indicated in the dot LCD 23 at step S93.

At step S94, whether or not the up-switch 89 is turned ON is checked. If the up-switch 89 is turned ON, the control proceeds to step S82. Conversely, if the up-switch 89 is not made ON, whether or not the down-switch 90 is turned ON is checked at step S95. If the down-switch 90 is turned ON, the control proceeds to step S92. Conversely, if the down-switch 90 is not turned ON, the control proceeds to step S96 to indicate the information corresponding to the "MAB MODE" in the segment LCD 22. Thereafter, the information (the enlarged symbol "57", etc.) corresponding to the "MAB MODE" are indicated in the dot LCD 23 at step S97.

Figure 36:
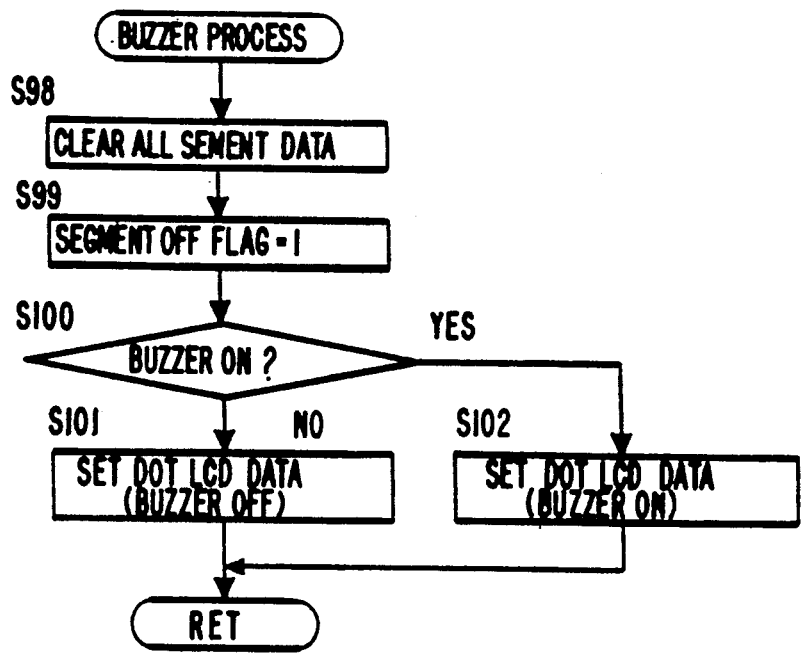
FIG. 36 is a diagram showing a flow chart of a subroutine of a "BUZZER PROCESS"; and, FIG. 37 is a diagram showing a flow chart of a subroutine of a "DOT LCD PROCESS".

The "BUZZER PROCESS" at step S41 will be described below in detail (See FIG. 36).

When the buzzer switch (operational switch 86) is turned ON, the data of the segment LCD 22 are all cleared in accordance therewith (step S98). Thereafter, the segment OFF flag is set to "1", indicating that the data of the segment LCD are all cleared at step S99, and whether or not the buzzer is turned ON is checked at step S100. If the buzzer is turned ON, the control proceeds to step S102 to indicate the information (the enlarged symbol "7", etc.) corresponding to the "BUZZER ON" in the dot LCD 23. Conversely, if the buzzer is not turned ON, the control proceeds to step S101 to indicate the information (the enlarged symbol "70", etc.) corresponding to the "BUZZER OFF" in the dot LCD 23. Thereafter, the control is returned.

Figure 37:
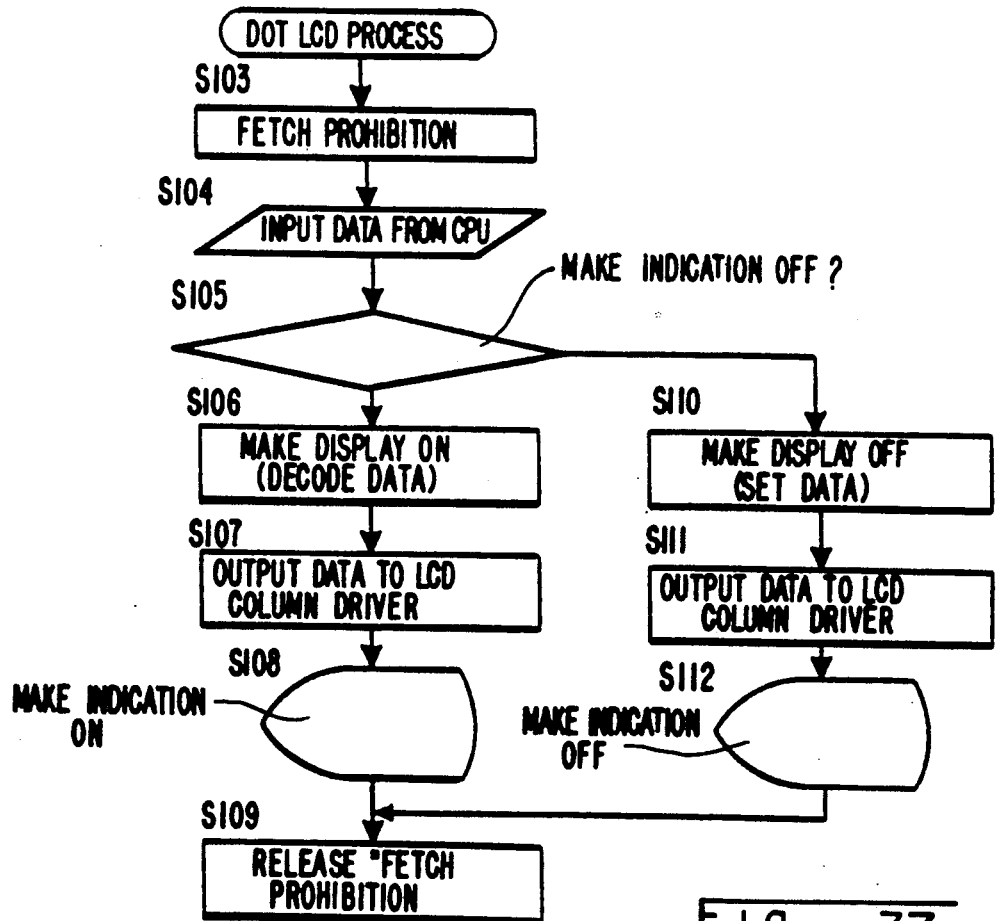

The "DOT LCD PROCESS" which is performed by the LCD controlling microcomputer 39 will be described below in detail (FIG. 37).

The "FETCH PROHIBITION" is first performed at step S103, so that the data to be indicated in the dot LCD 23 are inputted from the CPU 24 to the dot LCD 23 at step S104. At step S105, whether or not the indication of the dot LCD 23 should be made OFF (stopped) is checked. If the indication is made OFF (stopped), the control proceeds to step S110. Conversely, if the indication is not turned OFF, the control proceeds to step S106 to make the display of the dot LCD 23 ON, thereby to decode the data. Thereafter, the decoded data are ouputted to the column driver 38 at step S107. Thereafter, the data are indicated in the dot LCD 23 to release the fetch prohibition (step S109).

In the above mentioned embodiments, although the indicating apparatus of the present invention have been applied to a still camera, the application of the present invention is not limited thereto. For instance, the present invention can be applied to an electronic still camera or a video camera, etc.

At step S110, the display of the dot LCD 23 is erased and the data are set. Thereafter these data are outputted to the column driver 38. Furthermore, the dot LCD 23 is erased (step S110 through S112).

We claim:

1. An indicating apparatus of a camera having a camera body, on which an indicating portion is disposed, said apparatus comprising an indication portion in which camera information is indicated, wherein said indicating portion comprises a first indicating portion in which information related to said camera is indicated, and a second indicating portion which indicates, in an enlarged size, at least a portion of the information indicated in said first indicating portion.

2. An indicating apparatus according to claim 1, wherein said information indicated in said first indicating portion is photographing information.

3. An indicating apparatus according to claim 2, wherein said photographing information is related to "a powered zoom mode".

4. An indicating apparatus according to claim 2, wherein said photographing information is related to "a program depth of field priority".

5. An indicating apparatus according to claim 2, wherein said photographing information is related to "a program action".

6. An indicating apparatus according to claim 2, wherein said photographing information is related to "a battery mode".

7. An indicating apparatus according to claim 2, wherein said photographing information is related to "a daylight synchro mode".

8. An indicating apparatus according to claim 2, wherein said photographing information is related to "an automatic emission prohibition mode".

9. An indicating apparatus according to claim 2, wherein said photographing information is related to "a spot photometering mode".

10. An indicating apparatus according to claim 2, wherein said photographing information is related to "a self-timer mode".

11. An indicating apparatus according to claim 2, wherein said photographing information is related to "a drive mode".

12. An indicating apparatus according to claim 1, wherein said information indicated in said first indicating portion is error information.

13. An indicating apparatus according to claim 12, wherein said error information is related to a loading error.

14. An indicating apparatus according to claim 12, wherein said error information is related to a film changing.

15. An indicating apparatus according to claim 12, wherein said error information is related to a detachment of lens.

16. An indicating apparatus according to claim 1, wherein said first indicating portion is composed of a plural segment LCD, and said second indicating portion is composed of a plural dot LCD.

17. An indicating apparatus according to claim 16, wherein illustrated contours of the camera body and a lens portion are indicated in segment-indication manner in said first indicating portion.

18. An indicating apparatus according to claim 16, wherein a symbol of "powered zoom mode" is indicated in said first indicating portion in segment indicating manner.

19. An indicating apparatus according to claim 16, wherein a symbol of "program depth of field priority" is indicated in said first indicating portion in segment indicating manner.

20. An indicating apparatus according to claim 16, wherein a symbol of "program action" is indicated in said first indicating portion in segment indicating manner.

21. An indicating apparatus according to claim 16, wherein a symbol of "battery mode" is indicated in said first indicating portion in segment indicating manner.

22. An indicating apparatus according to claim 16, wherein a symbol of "daylight synchro-mode" is indicated in said first indicating portion in segment indicating manner.

23. An indicating apparatus according to claim 16, wherein a symbol of "automatic emission prohibition mode" is indicated in said first indicating portion in segment indicating manner.

24. An indicating apparatus according to claim 16, wherein a symbol of "spot photometering mode" is indicated in said first indicating portion in segment indicating manner.

25. An indicating apparatus according to claim 16, wherein a symbol of "self-timer mode" is indicated in said first indicating portion in segment indicating manner.

26. An indicating apparatus according to claim 16, wherein a symbol of "single photographing mode" is indicated in said first indication portion in segment indicating manner.

27. An indicating apparatus according to claim 16, wherein a symbol of "continuous photographing mode" is indicated in said first indicating portion in segment indicating manner.

28. An indicating apparatus according to claim 16, wherein a symbol of "multi auto bracketing mode" is indicated in said first indicating portion in segment indicating manner.

29. An indicating apparatus according to claim 16, wherein a symbol of "powered zoom mode" is indicated in said second indicating portion in dot indicating manner.

30. An indicating apparatus according to claim 16, wherein a symbol of "program depth of field priority" is indicated in said second indicating portion in dot indicating manner.

31. An indicating apparatus according to claim 16, wherein a symbol of "program action" is indicated in said second indicating portion in dot indicating manner.

32. An indicating apparatus according to claim 16, wherein a symbol of "battery mode" is indicated in said second indicating portion in dot indicating manner.

33. An indicating apparatus according to claim 16, wherein a symbol of "daylight synchro-mode" is indicated in said second indicating portion in dot indicating manner.

34. An indicating apparatus according to claim 16, wherein a symbol of "automatic emission prohibition mode" is indicated in said second indicating portion in dot indicating manner.

35. An indicating apparatus according to claim 16, wherein a symbol of "spot photometering mode" is indicated in said second indicating portion in dot indicating manner.

36. An indicating apparatus according to claim 16, wherein a symbol of "self-timer mode" is indicated in said second indicating portion in dot indicating manner.

37. An indicating apparatus according to claim 16, wherein a symbol of "single photographing mode" is indicated in said second indicating portion in dot indicating manner.

38. An indicating apparatus according to claim 16, wherein a symbol of "continuous photographing mode" is indicated in said second indicating portion in dot indicating manner.

39. An indicating apparatus according to claim 16, wherein a symbol of "multi auto bracketing mode" is indicated in said second indicating portion in dot indicating manner.

40. An indicating apparatus according to claim 16, wherein a symbol of "buzzer mode" is indicated in said second indicating portion in dot indicating manner.

41. An indicating apparatus according to claim 1, wherein at least a portion of said information indicated in said first indicating portion is simultaneously indicated in said second indicating portion in an enlarged size.

42. An indicating apparatus according to claim 1, wherein said camera is provided with at least one operational switch, and an up-switch and a down-switch to indicate, in an enlarged size, at least a portion of said information in said second indicating portion by pressing said up-switch or said down-switch while said operational switch is being pressed.

43. An indicating apparatus according to claim 1, wherein an illustrated film which varies in accordance with an actual amount of film being wound is indicated in said first indicating portion when a film is wound.

44. An indicating apparatus according to claim 1, wherein a battery mark is indicated in a small size in said first indicating portion, and said battery mark is indicated in a large size, relative to said small size, in said second indicating portion, with the remaining voltage level indicated by the height of a color bar from the bottom of said battery mark.

45. An indicating apparatus according to claim 1, further comprising mode varying means for varying photographing modes of said camera.

46. An indicating apparatus according to claim 45, further comprising indicating control means for indicating related information to be changed in said second indicating portion when the photographing mode is changed by said mode varying means.

47. An indicating apparatus according to claim 45, further comprising indication control means for indicating information regarding the mode which is to be varied by said mode varying means in said second indicating portion.

48. An indicating apparatus according to claim 42, further comprising information transferring an indicating means for erasing information indicated in said second indicating portion in making the erased information reappear after the lapse of a predetermined time in said first indicating portion.

49. An indicating apparatus according to claim 1, further comprising error detecting means for detecting an error in the functions of said camera.

50. An indicating apparatus according to claim 49, further comprising error indication control means for indicating information on an error in enlarged size in accordance with detection by said error detecting means, in said second indicating portion.

51. An indicating apparatus according to claim 49, further comprising error indication controls means for indicating information on an error in accordance with detection by said error detecting means in said first indicating portion, and for indicating information on an error; in an enlarged size, in accordance with detection by said error detecting means in said second indicating portion.

52. An indicating apparatus of a camera having a camera body, said indicating apparatus comprising an indicating portion in which information related to said camera is indicated, wherein said indicating portion comprise a first indicating portion in which information related to said camera is indicated; a second indicating portion which indicates, in enlarged size, specific information indicated in said first indicating portion; and mode varying means for varying photographing modes.

53. An indicating apparatus of a camera having a camera body, said indicating apparatus comprising an indicating portion in which information related to said camera is indicated, wherein said indicating portion comprises a first indicating portion in which information related to said camera and indicated; a second indicating portion in which indicates specific information indicated in said first indicating portion in enlarged fashion; mode varying means for varying photographing modes; and indicating control means which indicates related information to be changed in said second indicating portion when the photographing mode is changed by said mode varying means.

54. An indicating apparatus of a camera having a camera body, said indicating apparatus comprising an indicating portion in which information related to said camera is indicated, wherein said indicating portion comprises a first indicating portion in which information related to said camera is indicated; a second indicating portion which indicates specific information indicated in said first indicating portion in enlarged fashion; mode varying means for varying photographing modes; indicating control means which indicates related information to be changed in said second indicating portion when the photographing mode is changed by said mode varying means; and information transferring and indicating means for erasing information from said second indicating portion and making the erased information reappear in said first indicating portion after the lapse of a predetermined time or when the mode varying means is turned off.

55. An indicating apparatus of a camera having a camera body, said indicating apparatus comprising an indicating portion in which information related to said camera is indicated, wherein said indicating portion comprises a first indicating portion in which information related to said camera is indicated; a second indicating portion which indicates specific information indicated in said first indicating portion in enlarged fashion; mode varying means for varying photographing mode; indicating control means which indicates related information to be changed in said second indicating portion when the photographing mode is changed by said mode varying means; information transferring and indicating means for erasing information from said second indicating portion and making the erased information reappear in said first indicating portion after the lapse of a predetermined time or immediately when said mode varying means is turned off or after the lapse of a predetermined time; and error detecting means for detecting an error in the functions of the camera.

56. An indicating apparatus of a camera having a camera body, said indicating apparatus comprising an indicating portion in which information related to said camera is indicated, wherein said indicating portion comprises a first indicating portion in which information related to said camera is indicated; a second indicating portion which indicates specific information indicated in said first indicating portion in enlarged size; mode varying means for varying photographing modes; indicating control means which indicates related information to be changed in said second indicating portion when the photographing mode is changed by said mode varying means; information transferring and indicating means for erasing information from said second indicating portion and making the erased information reappear in said first indicating portion after the lapse of a predetermined time or immediately when said mode varying means is turned off, or after the lapse of a predetermined time; error detecting means for detecting an error in the functions of said camera; and error indication control means for indicating information on an error in accordance with detecting by said error detecting means in said first indicating portion, and for indicating said information on an error in accordance with detection by said error detecting means in said second indicating portion in enlarged size.

57. An indicating apparatus for a camera, said apparatus comprising indicating means, positioned on said camera, for displaying information, said indicating means comprising a first indicting portion for displaying predetermined information regarding said camera, and a second indicating portion for displaying at least a selected portion of the predetermined information displayed in said first indicating portion, said second indication portion displaying the selected portion of the predetermined information in a size larger than the size that the predetermined information is displayed in said first indicating portion, and, means for selecting information, displayed in said first indicating portion, for display in said second indicating portion.

* * * * *

UNITED STATES PATENT AND TRADEMARK OFFICE
CERTIFICATE OF CORRECTION

PATENT NO. : 5,142,320

DATED : August 20 1992

INVENTOR(S) : S. NAKANO et al.

It is certified that error appears in the above-identified patent and that said Letters Patent is hereby corrected as shown below:

On the cover, after the paragraph titled "Inventors:" insert Item ---[73] Assignee: Asahi Kogaku Kogyo Kabushiki Kaisha, Tokyo, Japan---.

At column 22, line 17 (claim 1, line 3), change "indication" to ---indicating---.

At column 23, line 40 (claim 26, line 3), change "indication" to ---indicating---.

At column 25, line 21 (claim 52, line 5), change "comprise" to ---comprises---.

At column 26, line 36 (claim 57, line 18), inserted --- after said mode varying means is turned off--- after "time".

At column 26, line 39 (claim 57, line 21), change "detecting" to ---detection---.

Signed and Sealed this

Twenty-eighth Day of December, 1993

*Attest:*

BRUCE LEHMAN

*Attesting Officer*     Commissioner of Patents and Trademarks